US010175496B2

(12) United States Patent
Lee-Bouhours et al.

(10) Patent No.: US 10,175,496 B2
(45) Date of Patent: Jan. 8, 2019

(54) WIDE SPECTRAL BAND SUBWAVELENGTH DIFFRACTIVE COMPONENT

(71) Applicant: THALES, Courbevoie (FR)

(72) Inventors: Mane-Si Laure Lee-Bouhours, Palaiseau (FR); Brigitte Loiseaux, Palaiseau (FR); Gaëlle Lehoucq, Palaiseau (FR)

(73) Assignee: THALES, Courbevoie (FR)

(*) Notice: Subject to any disclaimer, the term of this patent is extended or adjusted under 35 U.S.C. 154(b) by 0 days.

(21) Appl. No.: 15/428,093

(22) Filed: Feb. 8, 2017

(65) Prior Publication Data
US 2017/0235153 A1  Aug. 17, 2017

(30) Foreign Application Priority Data

Feb. 12, 2016 (FR) ...................... 16 00237

(51) Int. Cl.
G02B 5/18 (2006.01)
G02B 27/42 (2006.01)
(Continued)

(52) U.S. Cl.
CPC ............ G02B 27/4266 (2013.01); G02B 1/11 (2013.01); G02B 5/1809 (2013.01);
(Continued)

(58) Field of Classification Search
CPC ............. G02B 5/18; G02B 2005/1804; G02B 5/1809; G02B 5/1814; G02B 5/1819;
(Continued)

(56) References Cited

U.S. PATENT DOCUMENTS 7,262,915 B2 * 8/2007 Kleemann ............ G02B 5/1838
359/565
2002/0001066 A1 * 1/2002 Kobayashi ........... G02B 5/1876
353/31
(Continued)

FOREIGN PATENT DOCUMENTS

WO 2005/038501 A1 4/2005
WO 2014/128015 A1 8/2014

OTHER PUBLICATIONS

Christophe Sauvan et al., "Broadband blazing with artificial dielectrics," Optics Letters, vol. 29, No. 14, Jul. 15, 2004, pp. 1593-1595.
(Continued)

Primary Examiner — Arnel C Lavarias
(74) Attorney, Agent, or Firm — Baker & Hostetler LLP

(57) ABSTRACT

A wideband diffractive component diffracting an incident beam exhibiting a wavelength in a diffraction spectral band is provided. The diffractive component elementary areas are arranged on a surface, each area belonging to a type indexed by an index i lying between 1 and n, with n greater than 1, corresponding to blaze wavelength $\lambda i$ of index i, the blaze wavelengths lying in the diffraction spectral band. An elementary area of type i includes microstructures sized less than 1.5 times the blaze wavelength of index i, arranged to form an artificial material exhibiting an effective index variation where an elementary area of type i constitutes a blazed diffractive element at the blaze wavelength $\lambda i$ of index i, the different values of the blaze wavelengths and the proportion of surface area occupied by the areas of a given type a function of a global diffraction efficiency desired in the diffraction spectral band.

17 Claims, 15 Drawing Sheets

(51) Int. Cl.
  *G02B 1/11* (2015.01)
  *G02B 27/00* (2006.01)
(52) U.S. Cl.
  CPC ......... *G02B 5/1861* (2013.01); *G02B 5/1866* (2013.01); *G02B 5/1876* (2013.01); *G02B 27/0012* (2013.01); *G02B 27/42* (2013.01); *G02B 27/4288* (2013.01); *G02B 2005/1804* (2013.01)
(58) Field of Classification Search
  CPC .. G02B 5/1823; G02B 5/1861; G02B 5/1866; G02B 5/1871; G02B 5/1876; G02B 27/42; G02B 27/4266; G02B 27/4288
  USPC ....... 359/558, 565, 566, 569, 570, 571, 572, 359/573, 574, 575, 576
  See application file for complete search history.

(56) References Cited

U.S. PATENT DOCUMENTS

| | | | | |
|---|---|---|---|---|
| 2003/0227860 | A1* | 12/2003 | Hamaguchi | G02B 27/4238 369/112.12 |
| 2005/0207012 | A1* | 9/2005 | Arnold | G02B 5/18 359/571 |
| 2007/0103782 | A1 | 5/2007 | Lee et al. | |
| 2013/0076581 | A1 | 3/2013 | Lee-Bouhours et al. | |
| 2015/0380829 | A1 | 12/2015 | Lee-Bouhours et al. | |

OTHER PUBLICATIONS

Philippe Lalanne, "Waveguiding in blazed-binary diffractive elements," Journal of Optical Society of America, vol. 16, No. 10, Oct. 1999, pp. 2517-2520.

Philippe Lalanne et al., "On the effective medium theory of subwavelength periodic structures," Journal of Modern Optics, 1996, vol. 43, No. 10, pp. 2063-2085.

Philippe Lalanne, "Waveguiding in blazed-binary diffractive elements," Journal of Opt. Soc. Am. A., vol. 16, No. 10, Oct. 1999, pp. 2517-2520.

* cited by examiner

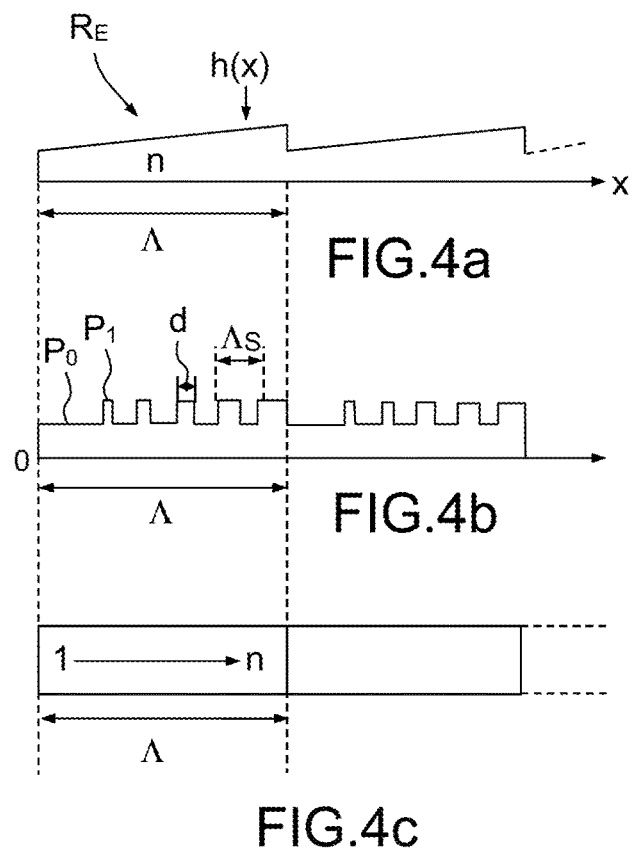
FIG.4a
FIG.4b
FIG.4c
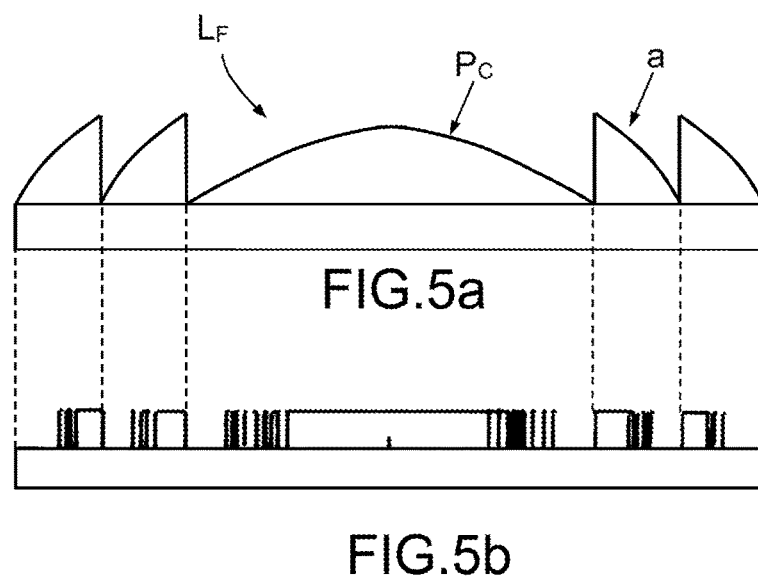
FIG.5a
FIG.5b

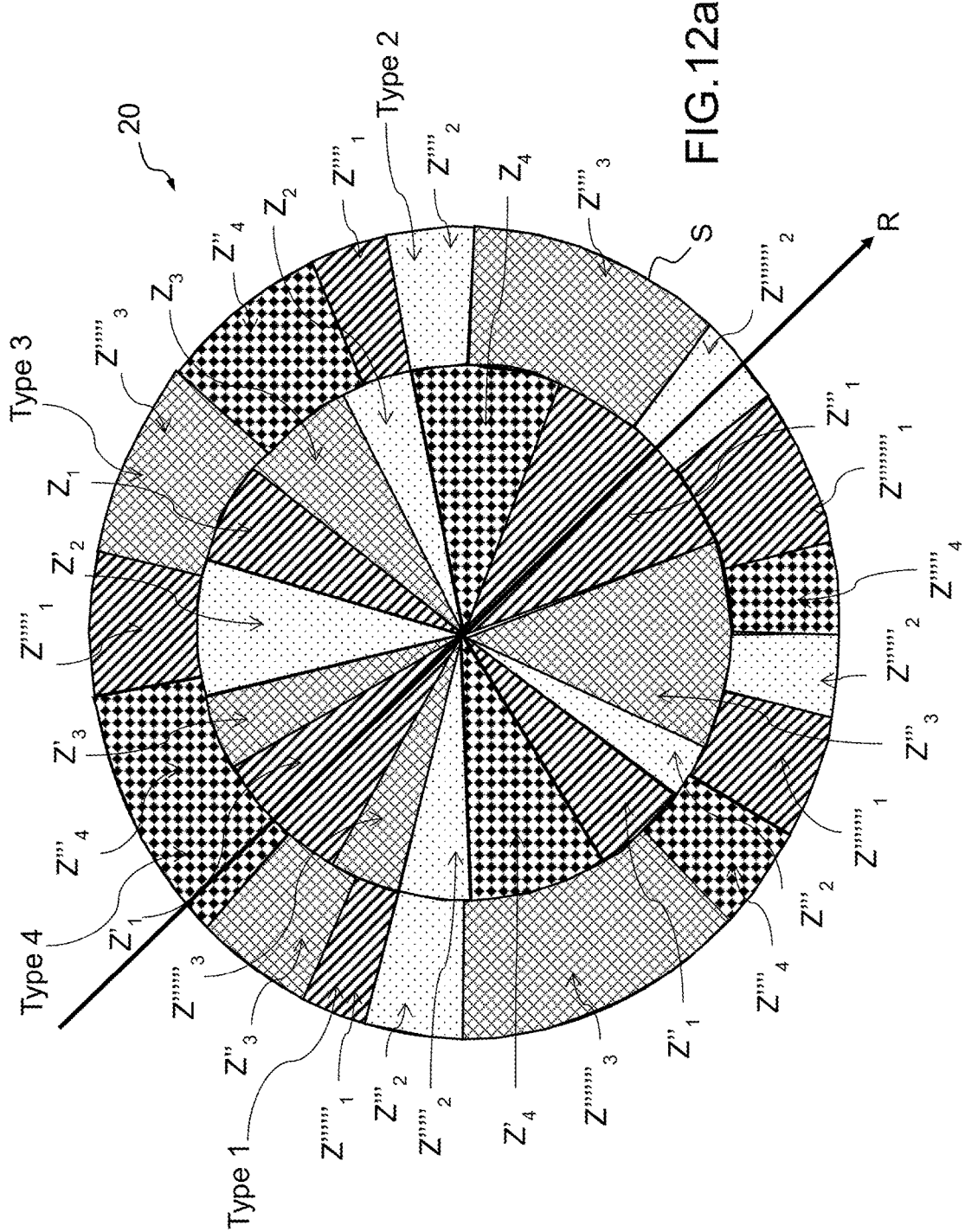

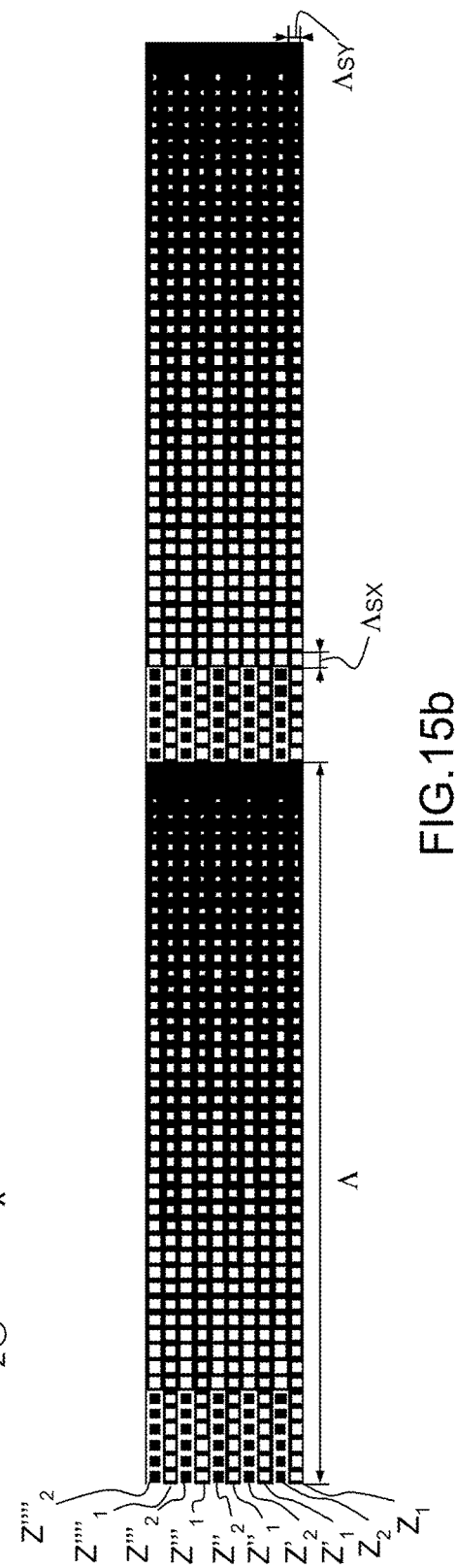

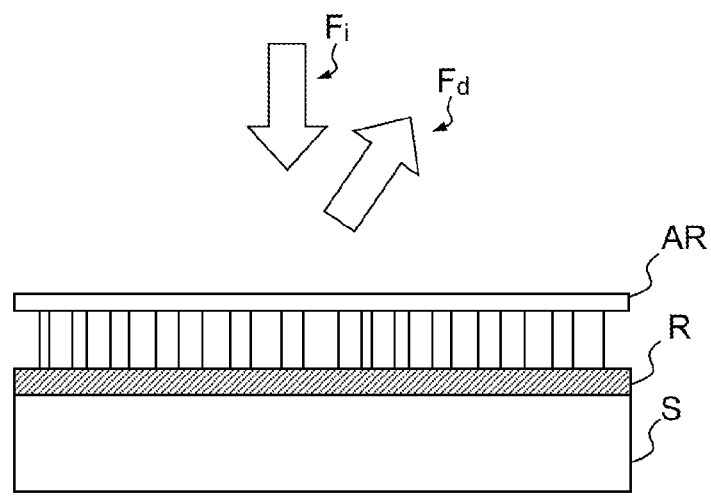
FIG.19
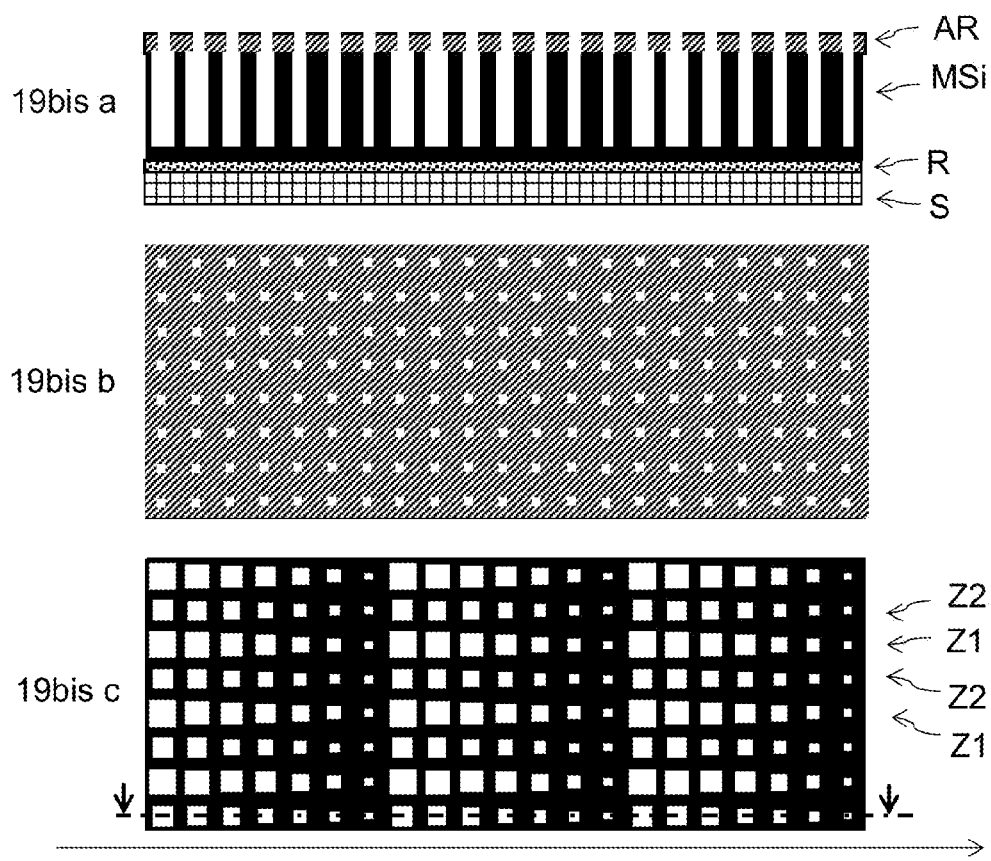
FIG.19 bis

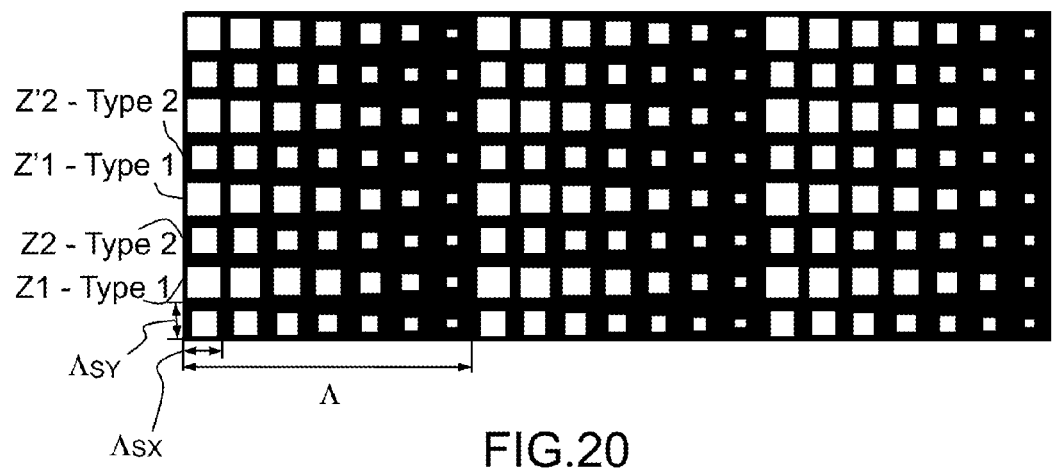
FIG.20
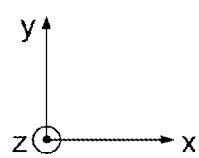
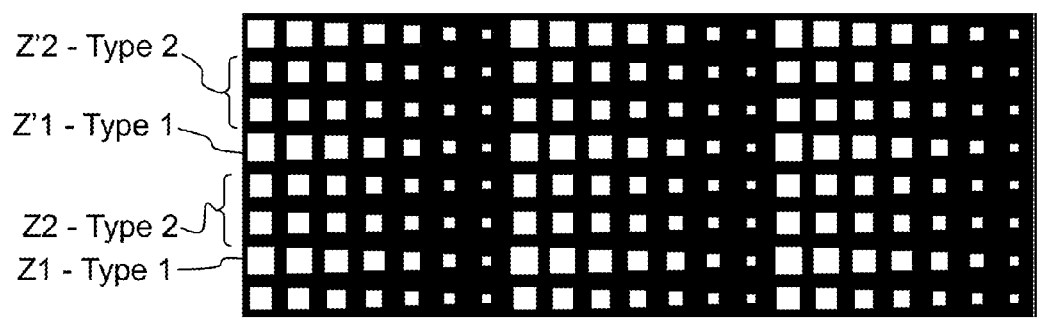
FIG.21

WIDE SPECTRAL BAND SUBWAVELENGTH DIFFRACTIVE COMPONENT

CROSS-REFERENCE TO RELATED APPLICATIONS

This application claims priority to foreign French patent application No. FR 1600237, filed on Feb. 12, 2016, the disclosure of which is incorporated by reference in its entirety.

FIELD OF THE INVENTION

The invention relates to the production of a subwavelength diffractive component of binary type exhibiting a good diffraction efficiency over a wide spectral band, for various optical (visible/infrared) and microwave applications, such as gratings or focusing lenses, in transmission or reflection mode.

BACKGROUND

The diffraction process does not consist of a simple transmission or reflection of an incident beam, light or microwave, in a new direction different from that of the incident beam: the incident beam is split up into several beams, each redirected at a different angle according to different orders of diffraction. The percentage of incident light redirected in a given order of diffraction is the measure of the diffraction efficiency in that order. The efficiency of a diffractive component is determined by the surface profile of that element.

Efforts are typically made to obtain a maximum efficiency in a given order and to minimize the efficiency in the other orders. If the percentage of light which is not directed in the desired order of diffraction is substantial, then the result is parasitic light, transmitted or reflected depending on the type of component or a drop in the light flux in the preferred direction, which is detrimental to the quality of the component or of the system incorporating the component.

To optimize the efficiency in a single order of diffraction, it is known practice to produce a so-called "blazed" diffractive structure, that is to say one which has little or no light/wave diffracted in the orders other than the desired order, called blaze order.

Conventional diffractive elements are known, such as the echelette gratings illustrated in FIG. 1, exhibiting a period $\Lambda$ which determines the angle by which the blaze order is diffracted, each period consisting of an element e called echelette. Also known are Fresnel lenses $L_F$ as illustrated in FIG. 2, having a central part Pc that is typically circular, and peripheral parts, rings A that are typically concentric (when the lens is in the axis).

The blaze effect sought is obtained by a gradual variation of the depth of a material of constant index n satisfying the blaze condition defined below.

The surface profile of these elements thus consists of continuous reliefs separated by discontinuities. These elements exhibit a maximum efficiency for a determined wavelength $\lambda 0$, called blaze wavelength.

The blaze condition in the order 1 corresponds to a phase variation $\Delta \varphi$ of a beam of wavelength $\lambda 0$ incident on the component, between x=0 and x=$\Lambda$, equal to $2\pi$.

$$\Delta \varphi(\lambda 0) = 2\pi$$

For example, for an echelette grating by transmission, this condition is conventionally expressed $$(n-1).h0 = \lambda 0$$

where n is the index of the material forming the grating and h0 is the height of the echelette.

FIG. 3 graphically illustrates the curve 15 of diffraction efficiency $\eta(\lambda)$ in transmission of order 1 for a diffractive component in the blazed scalar domain in the order 1 as a function of the incident wavelength $\lambda$ which is given by the formula:

$$\eta(\lambda) = \text{sinc}^2\left[\pi\left(1 - \frac{\lambda_0}{\lambda}\right)\right] \quad (1)$$

with $$\text{sinc}(x) = \frac{\sin(x)}{x}$$

The light lost in the blaze order (order 1) is diffracted in higher orders. To take the example of a hybrid lens, which is composed of a refractive lens on one face and a diffractive lens on the other face and where the role of the diffractive face is to correct the chromatic aberrations of the refractive lens, this phenomenon results in the transmission of a parasitic light, which is detrimental to the quality of the image. That results in practice in the appearance of diffracted light in all the image plane. For example, the output image is not sharp, or is dull.

It is shown that this drop in efficiency originates from the weak dispersion of the material, which causes, for a small wavelength difference, the phase difference $\Delta\varphi(\lambda)$ induced in the structure to diverge by $2\pi$ (whereas it is equal to $2\pi$ at the blaze wavelength $\lambda_0$).

In the scalar approximation, that is to say typically for components having very large area widths on the wavelength scale, typically more than 100 times the wavelength, by disregarding the Fresnel losses, and by considering an incident beam at normal incidence, the phase difference as a function of the wavelength $\Delta\varphi(\lambda)$ and the efficiency as a function of the wavelength $\eta(\lambda)$ are in fact given by:

$$\Delta\varphi(\lambda) = 2\pi \frac{\lambda_0}{\lambda} \frac{\Delta n(\lambda)}{\Delta n(\lambda_0)} \quad (2)$$

$$\eta(\lambda) = \text{sinc}^2[\pi(1 - \Delta\varphi(\lambda)/2\pi)] \quad (3)$$

where $\Delta n(\lambda) = (n(\lambda) - n_{air})$ or $(n(\lambda) - 1)$, for a diffractive optical element etched in a material of refractive index n.

For these diffractive optical elements, it can be considered that $\Delta n(\lambda) = \Delta n(\lambda_0)$, because the dispersion of the material is negligible: the refractive index varies little around $\lambda_0$. The equation (2) therefore becomes:

$$\Delta\varphi(\lambda) = 2\pi \frac{\lambda_0}{\lambda} \quad (4)$$

and the equation (1) seen above and represented in FIG. 3 is obtained, by replacing $\Delta\varphi(\lambda)$ with this expression in (2).

Thus, the weak dispersion of the optical material in the conventional diffractive optical elements causes a drop in efficiency of the diffraction with the wavelength $\lambda \neq \lambda_0$ expressed by the equation (1). This variation of the phase difference with the wavelength is also present for the diffractive components operating by reflection.

These conventional diffractive optical elements are not therefore efficient in wide spectral band terms. A wide spectral band over which diffraction is desired can be characterized by a parameter $\Delta\lambda/\lambda 0$, which is typically greater than 20% in the optical domain. For example, it is equal to 40% for thermal infrared, or equal to 100% for UV/VIS/NIR applications, and can even take the value of 130% in the photovoltaic domain. These conventional diffractive optical elements cannot be used in the optical systems dedicated to wide spectral band applications, such as gratings or lenses in optical instruments (transmission or reflection) or hybrid optical systems composed of refractive and diffractive optics.

Also known are other so-called binary microstructure diffractive optical elements, also called binary blazed gratings, or subwavelength diffractive optical elements (SW-DOE), described in the publication "Broadband blazing with artificial dielectrics" OPTICS LETTERS, Vol. 29, No. 14, 2004 and the document WO 2005/038501. These binary blazed gratings are designed by producing a binary synthesis of the profile on a conventional diffractive optical element: the starting point is the conventional diffractive optical element that is to be synthesized and this grating is sampled to obtain points, with which an index or phase shift value can be associated. The sampling must be done with a period less than the design wavelength, to obtain a grating operating in subwavelength regime. The various computation techniques used are known to those skilled in the art and will not be recalled here. These techniques make it possible, for example, for an echellete blazed grating such as the grating $R_E$ represented in FIGS. 1 and 4a, to define a binary blazed grating as represented in FIG. 4b. To return to FIG. 4a, two echelons of an echelette grating $R_E$ of period $\Lambda$ (or pitch of the grating) are represented. These echelons are etched in an optical material of index n.

A binary blazed grating corresponding to the grating $R_E$ of FIG. 4a is represented in FIG. 4b. The grating $R_E$ is sampled over a certain number of points at the period $\Lambda_s$ chosen less than the blaze wavelength $\lambda_0$. A certain number of points are obtained for each period $\Lambda$ of the grating. Each point has correlated with it a given fill factor for a given microstructure type (hole, pillar): this fill factor is equal to the dimension d of the microstructure related to the sampling period of the grating: $f=d/\Lambda_s$. The fill factor of each microstructure is defined, by known computations, to locally give a phase-shift value $\Phi(x)$ similar to that of the echelette grating at the point sampled, and equal, as is known, to $$\Phi(x) = 2\pi(n-1)h(x)\frac{1}{\lambda},$$

where x is the coordinate of the point sampled on the axis $0x$ of the grating.

In the example of FIG. 4b, the binary microstructures are of pillar type. A set of binary microstructures is obtained which code the echelon pattern of the grating. This set of microstructures is repeated with the period $\Lambda$ of the echelette grating of FIG. 4a.

In the synthesis operation, a fill factor f is therefore defined for each microstructure which varies from one microstructure to the other to follow the phase function of the echelette grating. In the example, over each period $\Lambda$ of the echelette grating (for each echelon), this dimension d increases with x. In practice, the fill factor f of a binary microstructure of the grating can take any real value lying between 0 and 1, including the values 0 and 1. For example, for the pillar $p_0$ in FIG. 4b, the fill factor is 0.

FIGS. 5a and 5b show a conventional diffractive optical element of Fresnel lens type $L_F$ (FIG. 5a), and its binary synthesis by means of microstructures (FIG. 5b).

To describe the behaviour of a binary diffractive optical element, a concept of effective index $n_{eff}$ is introduced to describe the interaction of the light on the microstructures. With this concept, the structure of the element is likened to a homogeneous artificial material, giving, on the component, an index profile comparable to a grating with effective index gradient, the effective index of which varies over the period $\Lambda$ (or the portion) of the grating concerned. FIG. 4c schematically represents a grating with effective index gradient corresponding to the binary blazed grating of FIG. 4b.

This concept of effective index and analytical formulae making it possible to calculate it are described in detail in various publications, of which the following can be cited: "On the effective medium theory of subwavelength periodic structures", Journal of Modern Optics, 1996, vol. 43, No. 10, 2063-2085 by Ph. Lalanne, D. Lemercier-Lalanne, which shows in particular the curves of effective index variation with the fill factor and the incident wavelength (p. 2078).

In practice, the effective index is a function of the fill factor f (and therefore of the sampling period $\Lambda_s$) of the geometry of the microstructure, of the index n of the material (or, which is equivalent, of its permittivity $\varepsilon$) and of the incident wavelength $\lambda$. Different analytical formulae are thus known to those skilled in the art, which make it possible to calculate, for a given artificial material, the curves of variation of the effective index as a function of the fill factor f of the microstructures (therefore as a function of d and $\Lambda_s$) and as a function of the incident wavelength $\lambda$.

In practice, this concept is valid in all the cases where the sampling period $\Lambda_s$ is substantially less than the structural cut-off value of the element, given by $$\frac{\lambda_0}{n},$$

where n is the refractive index of the material of the microstructures. This parameter gives the limit value of the sampling period, beyond which, for any fill factor, the material no longer behaves as a homogeneous material (thin layer), and for which work in subwavelength regime no longer applies. Beyond this value, there are many modes of propagation and many effective indices.

Substantially subwavelength propagation conditions are therefore assumed, with $\Lambda_s \leq 1.5 \cdot \lambda_0$ (preferably $$\Lambda_s \leq \lambda_0 \text{ or } \Lambda_s \leq \frac{\lambda_0}{n}).$$

Typically, in practice, $\Lambda_s = \lambda_0/2$ or $\lambda_0/3$ is generally chosen.

In these conditions, the blaze effect (that is to say the diffraction of the incident light in a single order of diffraction, the blaze order) is therefore obtained by variation of the optical index along the surface of the optical material. In effect, the microstructures are too small (subwavelength) to be resolved by the incident light (in terms of far diffraction field) which locally perceives an average index, the effective index $n_{eff}$. Over a period (grating) or a part (Fresnel lens), the use of sub-λ microstructures makes it possible to produce a phase law optimized for the energy radiated in the main deflected beam (blaze order) to be favoured, and the energy diffracted in the parasitic diffracted beams to be minimized.

The usual microstructures have geometries that are either hollowed out and of hole type, for example cylindrical, or protruding and of pillar type, for example with round, square, hexagonal or rectangular section. A combination of holes and pillars is also possible. The microstructures are of any form, preferentially with axes of symmetry to make them independent of the polarization of the incident beam at normal incidence.

Advantageously, they are arranged, within a period (grating) or a part (Fresnel lens), according to a sampling period $\Lambda_s$ at least on the direction $0x$ of the surface plane of the grating or according to a radius starting from the centre for an in-axis lens. The structure of an off-axis lens is also applicable to the invention.

FIG. 6 illustrates an element 60 synthesizing a grating based on pillars P seen from above. In the example of 2D grating represented in FIG. 6 schematically, the mesh is square of dimensions $\Lambda_{sx}=\Lambda_{sy}=\Lambda_s$. In this example, there is a microstructure P for each mesh, for example at the centre of each mesh. The microstructures aligned in the direction $0X$ of the surface plane XY of the grating are assigned a fill factor varying progressively in a determined order, increasing or decreasing along the main direction $0X$ of the grating.

In the case of a synthesis of a grating of echelette (or multi-level) type, the microstructures aligned according to another dimension $0Y$ of the grating have an identical fill factor.

In the case (not represented here) of a synthesis of areas of a Fresnel lens, the fill factor of these microstructures can vary in all directions.

These binary blazed diffractive optical elements are known to exhibit efficiencies much greater than those of the conventional optics, and are used in the case of gratings with strong dispersion or for hybrid lenses with high numerical aperture.

The document WO 2005/038501 also describes a particular type of blazed transmission grating using the strong dispersion of the artificial materials to compensate for the variation of the diffraction efficiency as a function of the wavelength of the incident beam, in order to obtain blazed diffractive optical elements over a wide spectral band, that is to say diffractive optical elements that are efficient in their blaze order over a wide spectral band. These particular gratings, as illustrated in FIG. 7, use two different microstructure geometries, such as holes m1 and pillars m2. In a first portion, the microstructures according to the first geometry exhibit an effective index decreasing with the fill factor, and in a second portion the microstructures according to the second geometry synthesize an effective index increasing with the fill factor.

The composite artificial material 70 whose structure is illustrated in FIG. 7 exhibits an effective index gradient which varies between a minimum value $n_{eff min}$ and a maximum value $n_{eff max}$. The minimum and maximum effective indices of the material are determined from curves of variation of the effective index with the fill factor of the microstructures.

A characteristic parameter of the material is the parameter α defined by:

$$\alpha = \frac{(\delta n_{min} - \delta n_{max})}{\Delta n_{eff}(\lambda_0)}, \quad (5)$$

where $\Delta n_{eff}(\lambda_0)=n_{eff max}(\lambda_0)-n_{eff min}(\lambda_0)$,
$\delta n_{min}=n_{eff min}(\lambda_0)-n_{eff min}(\lambda_\infty)$ and
$\delta n_{max}=n_{eff max}(\lambda_0)-n_{eff max}(\lambda_\infty)$.

With $\lambda_0$ the design wavelength (or blaze wavelength) and $\lambda_\infty$ the great wavelength compared to the design wavelength $\lambda_0$.

To obtain a grating which offers an optimal spectral width, it is necessary for the characterization parameter α to be strictly greater than 0, α>0 and preferentially $0.3 \leq \alpha \leq 0.5$.

The characteristics of the material 70 (index n, fill factor of the pillars and of the holes, sampling sub period, etc.) are therefore determined so as to obtain extreme effective index values culminating in the desired value of α.

The document WO 2005/038501 describes, by way of example, an effective index range between 1.5 and 2.1, with $\Lambda_s=\lambda_0/2$. The sampling period $\Lambda_s$ codes the area of period Λ equal to $25\lambda_0$, corresponding to 50 microstructures (35 holes and 15 pillars). The first point is coded by f=0 by a microstructure of hole type. The last point is coded by a microstructure of pillar type coded with f=0.68.

The element 70 has been produced in silicon nitride $Si_3N_4$ (n=2.1) with geometries of cylindrical holes with round section and of pillars with etched square section. The depth h of etching is $1.875\lambda_0$. The maximum effective index $n_{eff max}$ is coded using holes of zero diameter ($n_{eff max}$=n=2.1) and the minimum effective index $n_{eff min}$ is coded using pillars of factor=0.68, i.e. of width $d=0.34\lambda_0$. For this binary blazed grating with composite artificial material, α=0.39.

The curve of diffraction efficiency as a function of wavelength is given in FIG. 8: an area is obtained around $\lambda 0$ that is fairly wide, in which the diffraction efficiency is, at its maximum, equal to 96% and remains above 90% between $0.6\lambda_0$ and $1.5\lambda_0$. The diffraction efficiency does not reach 100% in practice because of the discontinuities of the surface profile when switching from one type of geometry to another. At the discontinuity, there is a shadow effect and a phase discontinuity effect. The diffraction efficiency of this grating has been calculated for a grating period Λ equal to $25\lambda_0$. When there is a higher period, the effect of the discontinuities is lesser, and the efficiency is therefore better. With a period less than $25\lambda_0$, the effect of the discontinuities is greater and there is a loss in efficiency. A less good spectral width is obtained, but the improvement of the bandwidth may be satisfactory for certain applications. Thus, the use of composite artificial materials is not limited to components operating in the scalar domain. The concept of composite artificial material can be applied to the production of different subwavelength diffractive components, such as a grating illustrated in FIG. 9 or a Fresnel lens illustrated in FIG. 10.

However, the spectral width of the diffraction efficiency illustrated in FIG. 8 is not sufficient for certain applications such as spectroscopy and the production of optical or radiofrequency instruments for space (telescopes, etc.).

Also, the parameter α depends significantly on the material chosen, on the period and on the height of the structures, this having to take account of the fabrication constraints. In some applications, the choice of the material does not always lend itself to a parameter α>0.3, corresponding to a value lending itself to a use of the component over a very wide band. It is not therefore always easy to find all of the ideal conditions for the parameter α. It is often necessary to accept a slightly reduced α.

One aim of the present invention is to remedy the drawbacks mentioned by proposing a subwavelength diffractive component exhibiting a spectral width of its diffraction efficiency that is increased and a greater design flexibility to obtain a given efficiency curve mask η(λ).

SUMMARY OF THE INVENTION

The subject of the present invention is a wideband diffractive component capable of diffracting an incident beam exhibiting a wavelength lying in a diffraction spectral band, the diffractive component comprising a plurality of elementary areas arranged on a surface, each elementary area belonging to a type indexed by an index i lying between 1 and n, with n strictly greater than 1, the index i corresponding to a blaze wavelength λi of index i, the blaze wavelengths lying in the diffraction spectral band, an elementary area of type i comprising a plurality of microstructures respectively having at least a size less than 1.5 times the blaze wavelength of index i, the microstructures being arranged to form an artificial material exhibiting an effective index variation such that an elementary area of type i constitutes a blazed diffractive element at the blaze wavelength λi of index i, the different values of the blaze wavelengths and the proportion of surface area occupied by the set of the areas of a given type being a function of a global diffraction efficiency desired in the diffraction spectral band.

Preferentially, the elementary areas are contiguous.

Advantageously, the surface is flat or curved.

Advantageously, the incident beam is a light or radiofrequency wave.

According to one embodiment, the elementary areas are arranged on a transparent substrate, the component being configured to diffract the beam by transmission.

According to another embodiment, the component according to the invention further comprises a reflector, the reflector being arranged between the elementary areas and a substrate, the component being configured to diffract the beam by reflection.

According to a first variant, the component corresponds to a Fresnel lens having a central part and a plurality of peripheral parts, in which each elementary area of type i corresponds to at least one sector of a part of the Fresnel lens.

According to a second variant, the component corresponds to a grating, each elementary area of type i corresponding to a blazed grating at the blaze wavelength λi of index i, each elementary area exhibiting a periodic effective index variation on an axis X of period that is identical for all the types, a dimension of an elementary area in the direction X being equal to a multiple of the period.

According to one embodiment, the dimension of an elementary area according to X corresponds to the dimension of the component according to X.

According to one embodiment, the elementary areas are arranged in a direction Y at right angles to X such that all the types each follow one another once, a plurality of times, and in which the order of the types and the dimension according to Y of the areas of each type is repeated identically.

Preferentially, the microstructures of an elementary area take the form of a pillar, a hole or a combination of the two.

Advantageously, the diffractive component according to the invention further comprises an anti-reflection layer arranged above the microstructures.

Preferentially, the anti-reflection layer is a subwavelength scale-structured layer.

According to one embodiment, the component according to the invention further comprises a plurality of secondary microstructures having a size smaller than the size of the basic microstructures.

Advantageously, an effective index variation of a blazed diffractive element at a blaze wavelength λi over a period of a grating or a part of a Fresnel lens exhibits a minimum value and a maximum value, the difference between said effective index values being called $\Delta n_{eff}(i)$, the microstructures of an area of type i having a height hi of index i, the quantities $\Delta n_{eff}(i)$, hi and λi being linked by a blaze condition defined by:

$\Delta n_{eff}(i).hi = \lambda i$ for a diffractive component operating by transmission, 2. $\Delta n_{eff}(i).hi = \lambda i$ for a diffractive component operating by reflection.

Advantageously, for each elementary area of type i, the microstructures are arranged such that the difference $\Delta n_{eff}(i)$ bears out the blaze condition for a height value h that is identical for all the types.

According to one embodiment, for each elementary area of type i, the microstructures are arranged such that the difference $\Delta n_{eff}(i)$ is chosen for a characterization parameter αi defined below to be strictly greater than 0 regardless of i:

$$\alpha i = \frac{(\delta n_{i/min} - \delta n_{i/max})}{\Delta n_{eff}(i)} > 0$$

with $n_{eff}(i)$ effective index variation of a blazed elementary area at the wavelength λi over a period (grating) or a part (Fresnel lens) between a minimum value $n_{eff/min}(i)$ and a maximum value $n_{eff/max}(i)$, $\Delta n_{eff}(i) = n_{eff/max}(i) - n_{eff/min}(i)$, $\delta n_{i/min} = n_{eff/min}(i) - n_{eff/min}(\lambda_\infty)$ and $\delta n_{i/max} = n_{eff/max}(i) - n_{eff/max}(\lambda_\infty)$.

With i corresponding to a design wavelength $\lambda_i$ (or blaze wavelength) and $\lambda_\infty$ being a great wavelength compared to the design wavelength $\lambda_0$.

Other features, aims and advantages of the present invention will become apparent on reading the following detailed description and in light of the attached drawings given as non-limiting examples and in which:

FIG. 1, already cited, illustrates a conventional echelette grating.

FIG. 2, already cited, illustrates a conventional Fresnel lens.

FIG. 3, already cited, schematically represents the diffraction efficiency in transmission for a diffractive component in the blazed scalar domain in the order 1 as a function of the incident wavelength λ.

FIG. 4a, already cited, goes back to the conventional echelette diffractive grating of FIG. 1, FIG. 4b illustrates a subwavelength binary synthesis of this grating by means of microstructures of pillar type and FIG. 4c represents a corresponding grating with effective index gradient.

FIG. 5a, already cited, illustrates a conventional diffractive optical element of the Fresnel lens type, and FIG. 5b illustrates a subwavelength binary synthesis of this lens by means of microstructures of pillar type.

FIG. 6, already cited, illustrates an element synthesizing a grating based on pillars P seen from above.

FIG. 7, already cited, illustrates a period of a particular composite subwavelength grating using two different microstructure geometries.

FIG. 8, already cited, describes the diffraction efficiency in transmission as a function of the incident wavelength λ of a composite grating as described in FIG. 7.

FIG. 9, already cited, illustrates a two-dimensional grating structure based on composite subwavelength elements.

FIG. 10, already cited, illustrates a two-dimensional composite Fresnel lens structure based on composite subwavelength elements.

FIG. 11a describes the structure of the grating seen from above, FIG. 11b the microstructures of a particular area of the grating and FIG. 11c the corresponding effective index.

FIGS. 12a-12c illustrate a wideband diffractive component according to the invention of Fresnel lens type. FIG. 12a describes the structure of a lens seen from above, FIG. 12b the microstructures of a particular area of the lens and FIG. 12c the corresponding effective index.

FIGS. 15a-15b illustrate an example of the embodiment of FIG. 14.

FIG. 15a schematically represents the structure of the grating seen from above and FIG. 15b describes the arrangement of the corresponding microstructures seen from above.

Figure 16:
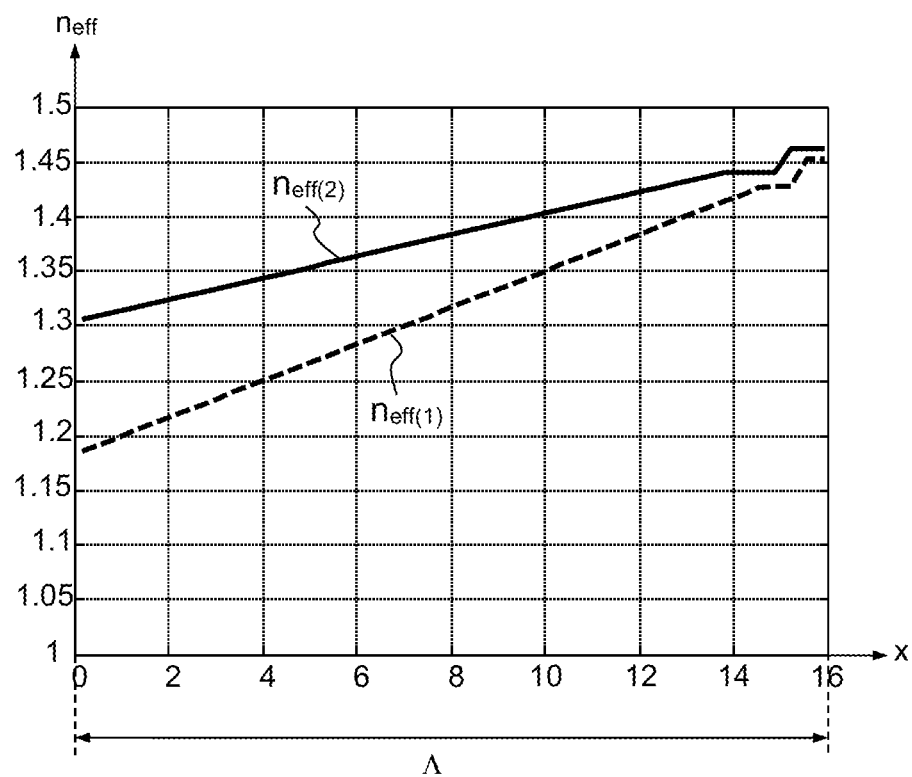

FIG. 16 schematically represents the effective index variation obtained from the grating described in FIGS. 15a-15b.

Figure 17:
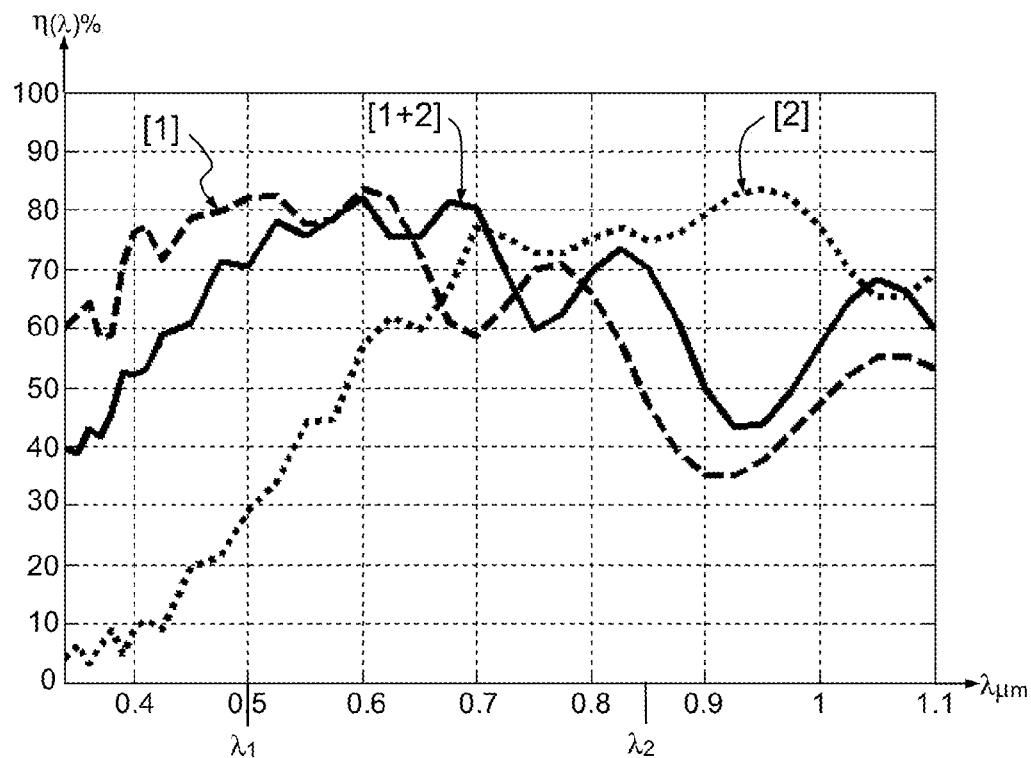

FIG. 17 illustrates the diffraction efficiency as a function of the wavelength of the grating illustrated in FIGS. 15a-15b, and the diffraction efficiencies of single-blaze gratings.

Figure 18:
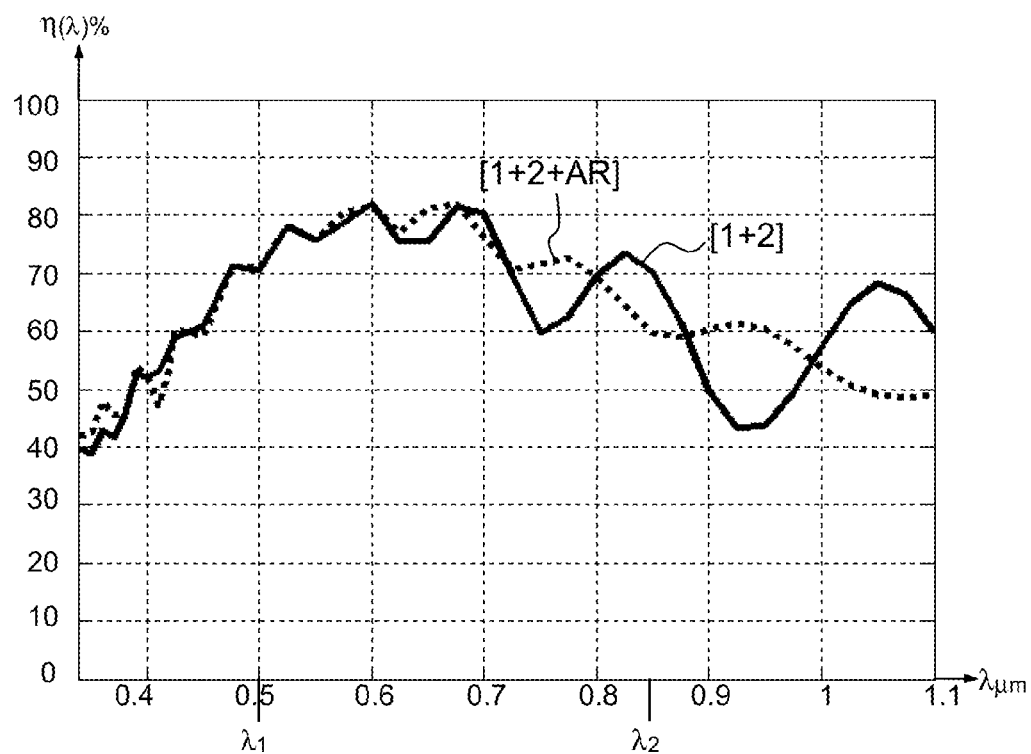

FIG. 18 illustrates the diffraction efficiency as a function of the wavelength of the grating illustrated in FIGS. 15a-15b and the efficiency with an identical grating provided with an anti-reflection layer.

FIG. 19 illustrates a binary multi-blaze diffractive component according to the invention provided with an anti-reflection layer arranged over the microstructures.

FIG. 19bis illustrates a binary multi-blaze diffractive component according to the invention provided with a subwavelength scale-structured anti-reflection layer. FIG. 19bisa illustrates the structure of the component according to the invention in profile view, FIG. 19bisb illustrates the structured anti-reflection layer AR seen from above and FIG. 19bisc illustrates an example of areas according to the invention seen from above.

FIGS. 20 and 21 illustrate two examples of grating arrangement according to the invention showing weightings on the different blaze wavelengths.

Figure 22:
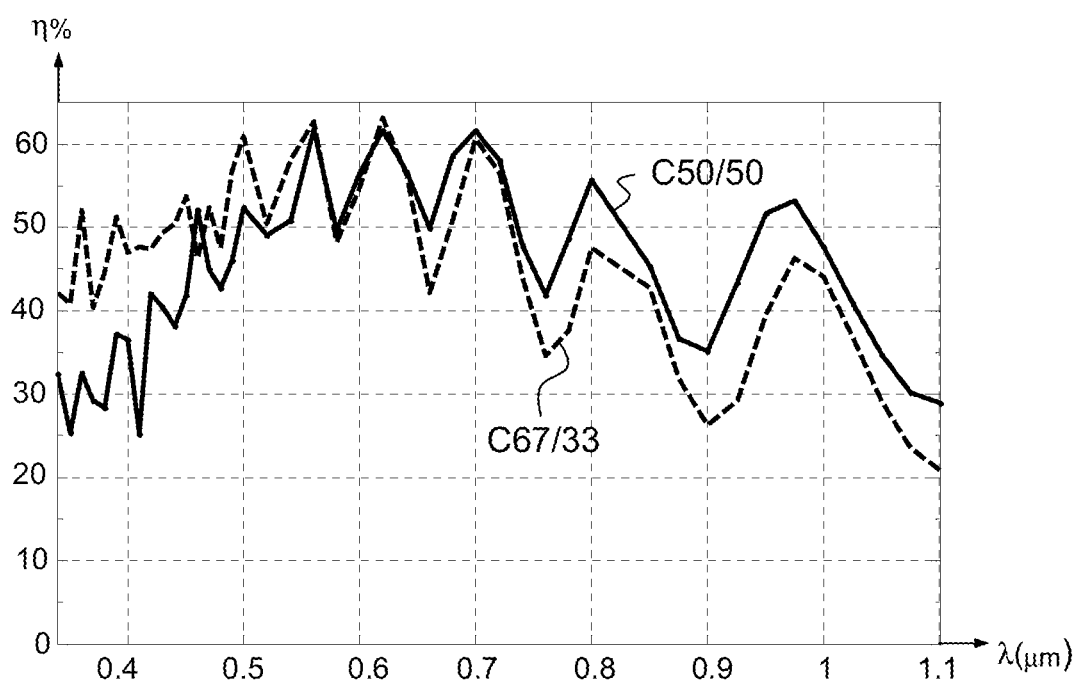

FIG. 22 describes the diffraction efficiency as a function of wavelength for the two examples of FIGS. 20 and 21.

DETAILED DESCRIPTION

Figure 11A:
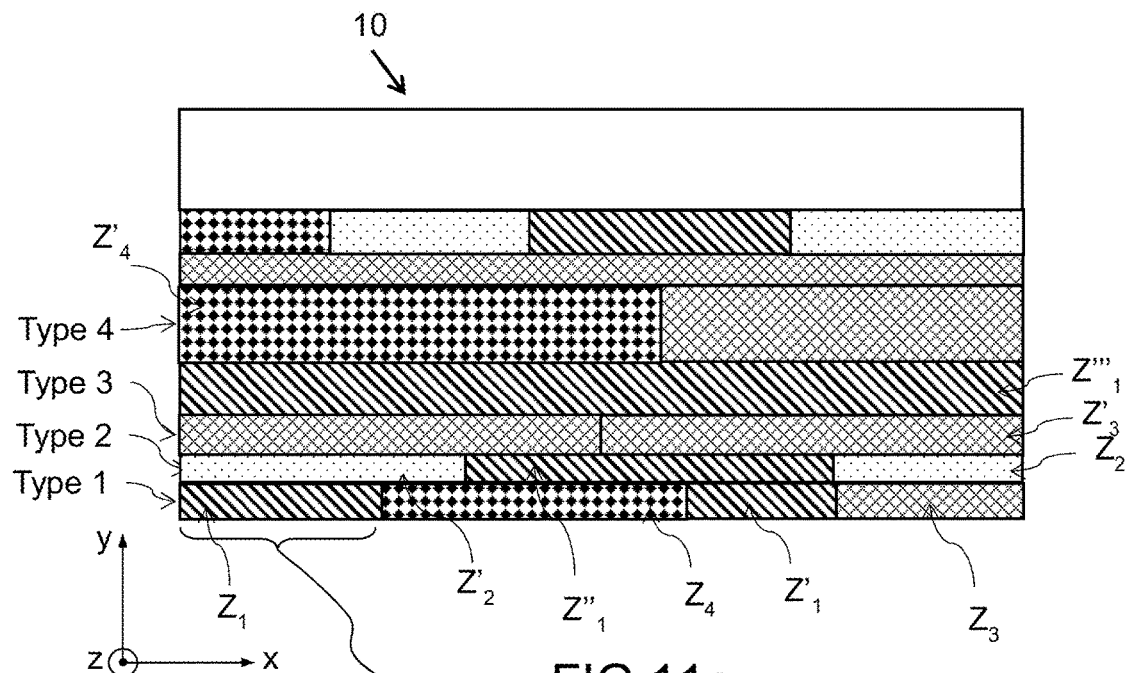
FIGS. 11a-11c illustrate a wideband diffractive component according to the invention of grating type.
Figure 11B:
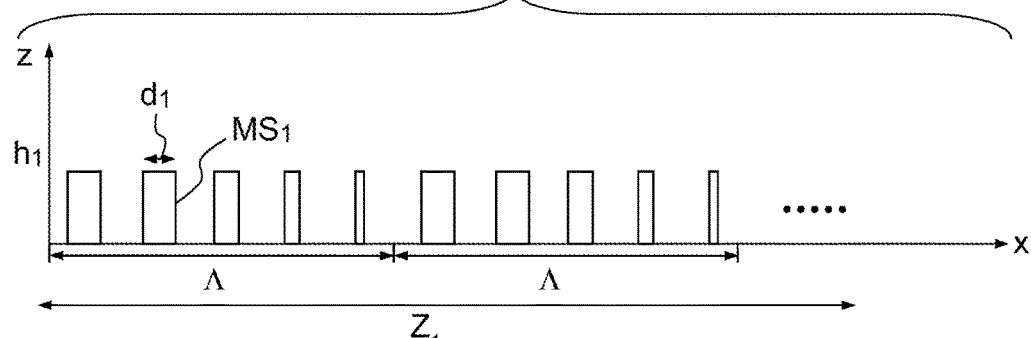
Figure 11C:
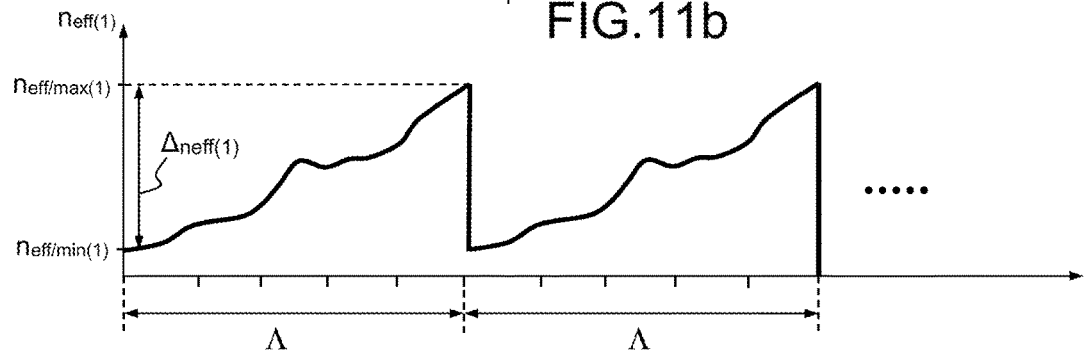

FIGS. 11a-11c illustrate a wideband diffractive component according to the invention, of grating type 10. The description of the diffractive component is given hereinbelow for the grating component illustrated in FIGS. 11a-11c but the considerations developed apply equally to a wideband diffractive component according to the invention of Fresnel lens type 20 illustrated in FIGS. 12a-12c.

The diffractive component 10 (20) according to the invention is able to diffract an incident beam, which is typically a light beam, for example visible/infrared or a radiofrequency beam, typically lying between 300 MHz and 300 GHz (see for example the document WO2014/128015), having a wavelength lying in the diffraction spectral band BSD.

The diffractive component whose plan view is illustrated in FIG. 11a (grating) and FIG. 12a (Fresnel lens) comprises a plurality of elementary areas Z1, Z'1, Z"1, Z2, Z'2, Z"2, Z3, Z'3, Z"3, Z4, Z'4 . . . arranged on a surface S. Each elementary area belongs to a type indexed by an index i lying between 1 and n with n (integer) strictly greater than 1, the index i corresponding to a blaze wavelength $\lambda i$ of index i. Thus, the diffractive component according to the invention comprises at least two elementary areas of different types.

For example, the areas Z1, Z'1, Z"1 are of type 1, that is to say correspond to a blaze wavelength $\lambda 1$, the areas Z2, Z'2, Z"2 are of type 2, that is to say correspond to a blaze wavelength $\lambda 2$, etc.

The blaze wavelengths $\lambda 1$, $\lambda 2$, $\lambda i$, $\lambda N$ lie within the diffraction spectral band BSD of the diffractive component 10 (20).

An elementary area of type i Zi, Z'i, Z"i comprises a plurality of microstructures MSi respectively having at least a size di less than 1.5 times the blaze wavelength $\lambda i$ of index i for the component to operate overall in subwavelength regime. Preferentially, the set of microstructures of an elementary area have a size di less than 1.5 times the blaze wavelength $\lambda i$ of index i.

The size of the microstructures is thus globally of the order of magnitude of or less than the blaze wavelength.

Advantageously, the set of microstructures of an elementary area have a size di less than 1.2 times the blaze wavelength $\lambda i$ of index i to avoid a loss of diffraction efficiency on the parasitic orders.

The microstructures are arranged to form an artificial material exhibiting an effective index variation $n_{eff}(i)$ such that the elementary area of type i constitutes a blazed diffractive element at the blaze wavelength $\lambda i$ of index i.

Thus, each elementary area of type i is an area having a subwavelength structure corresponding to a structure described in the prior art, for a design (or blaze) wavelength equal to $\lambda i$.

The microstructures are pillars, holes or a combination of the two. Within a period, the respective form of the holes or of the pillars can vary (rectangular, hexagonal, circular section), and upon a pillar/hole transition within one and the same period, a particular form of hole or pillar can be used.

Figure 12B:
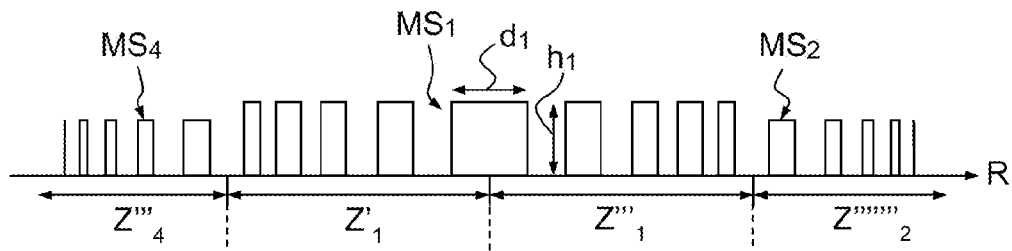
Figure 12C:
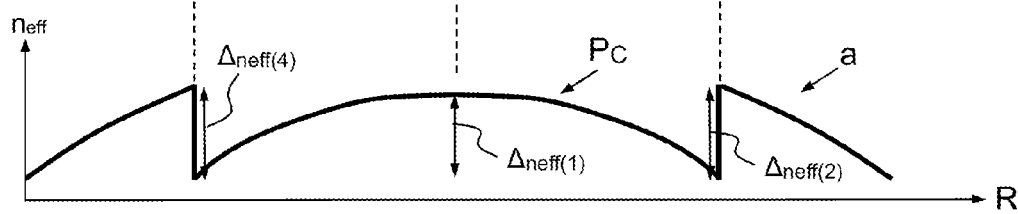

FIGS. 11b and 12b represent areas of type i made up of pillars MSi of variable size di and height hi, and FIGS. 11c and 12c represent the corresponding effective index variation.

The area Z1 of FIG. 11b corresponds to a blazed grating and therefore has a periodic structure of period Λ in at least one dimension X.

The areas Z'1, Z'''1 (type 1) of FIG. 12b correspond to sectors of the central part Pc of a Fresnel lens, and the areas Z''''''2(type 2) and Z'''4 (type 4) correspond to sectors of the peripheral part corresponding to the first ring.

In FIGS. 11a and 12a, several areas of type 1 (Z1, Z'1, Z"1, . . . ), of type 2 (Z2, Z'2, . . . ) etc. are distributed on the surface S. Generally, the areas are distributed in any manner, with no particular order.

The different values of the blaze wavelengths $\lambda i$ are within the desired diffraction spectral band and are chosen such that the component 10 (20) diffracts, with a good efficiency, an incident beam exhibiting an incident wavelength lying in the desired diffraction spectral band. For that, each area of type i (Zi, Z'i, Z"i, . . . ) diffracting around a given blaze wavelength contributes to the overall diffraction efficiency of the component, which benefits from an effect resulting from the sum of the interactions between the elementary complex amplitudes diffracted by each area of type i. These amplitudes take into account, among other things, the guiding effects which provide a better diffraction efficiency than the efficiency of an echelette grating. Thus, the overall efficiency of the diffractive component does not correspond to the average of the efficiencies of each area.

Two effects accumulate. First of all, a macroscopic effect: by placing two areas one alongside the other, each area having the same period according to x, it is possible to maintain the periodicity of a grating in the x direction to be able to diffract the order 1 in the desired direction. Then, associating the two areas amounts to adding them coherently.

However, locally, there are subwavelength structures which not only make it possible to code a phase function by virtue of their local effective index, which makes it possible to code the phase function of an echelette grating, but, in addition, they have another particular feature. These structures behave locally like waveguides and induce a wave guiding effect which makes it possible to obtain a better diffraction efficiency than the efficiency of an echelette grating. This guiding effect, which is the source of the good performance levels of the subwavelength gratings, has been explained in the publication by Lalanne, ref: Ph. Lalanne, "Waveguiding in blazed-binary diffractive elements", Journal of Opt. Soc. Am. A., vol. 16, 2517-2520 (1999). In our case of application, the combination of two areas side-by-side induces different guiding effects influenced by the guiding effects in the structures which are different from the guiding effects of each area individually.

In addition, the proportion of surface area occupied by the set of zones of a given type makes it possible to adapt to a desired overall diffraction efficiency mask. The percentage of surface area associated with a type makes it possible to introduce a weighting of the contribution of the different blaze wavelengths in the overall diffraction efficiency.

Figure 1:
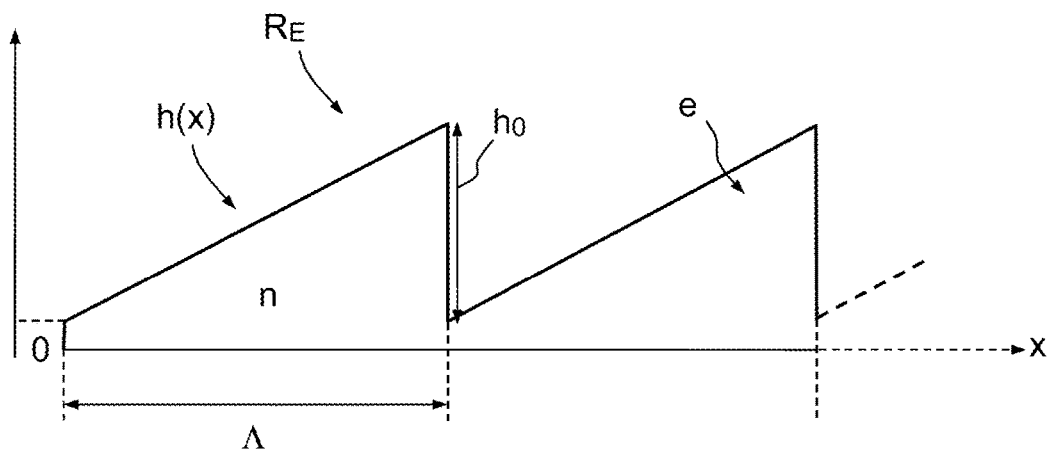
Figure 2:
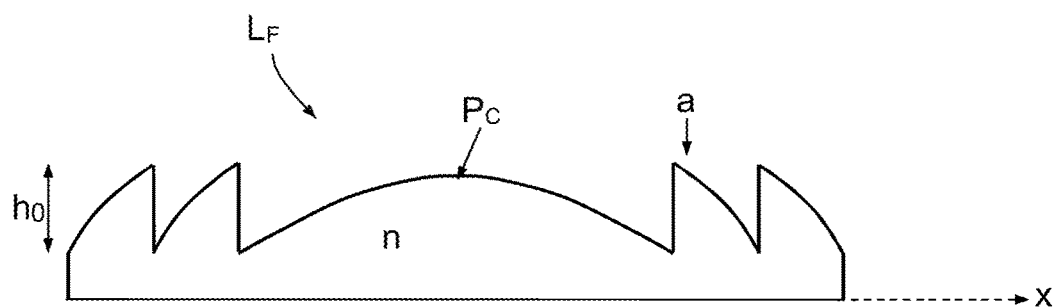
Figure 3:
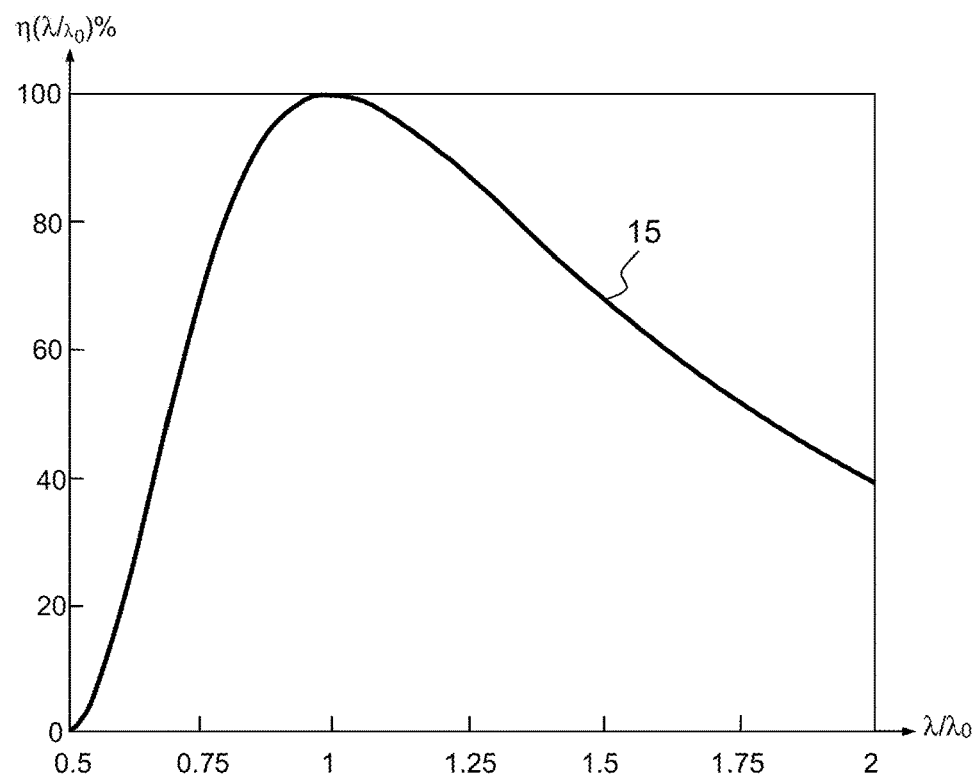
Figure 8:
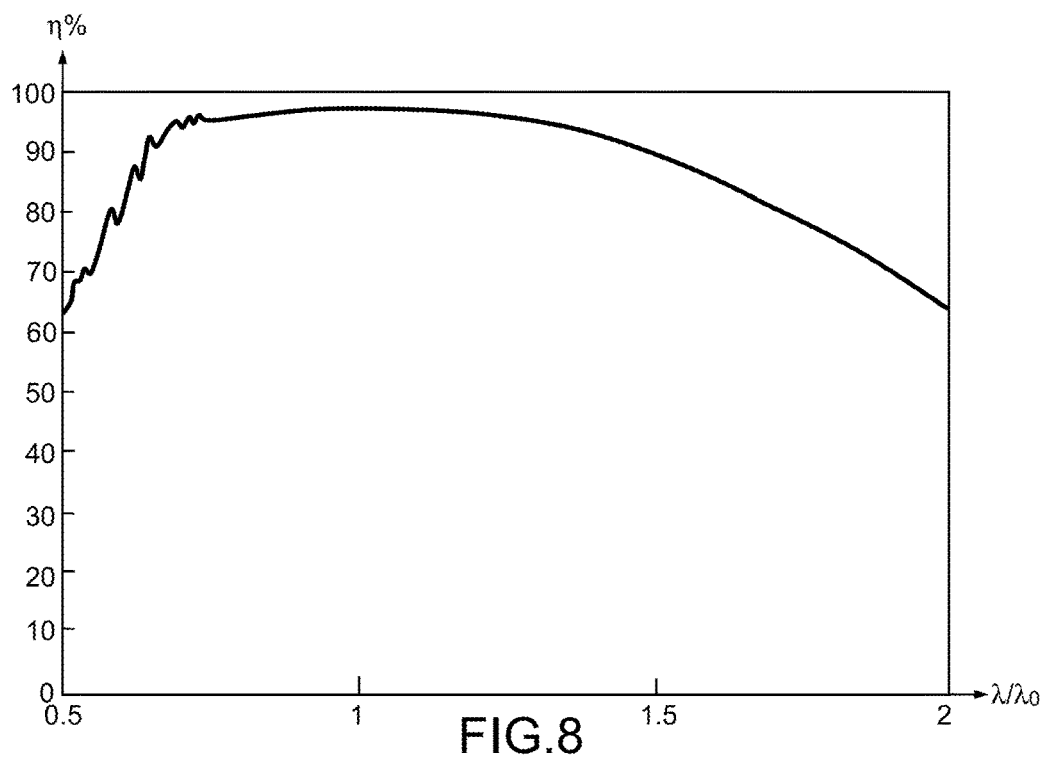
Figure 6:
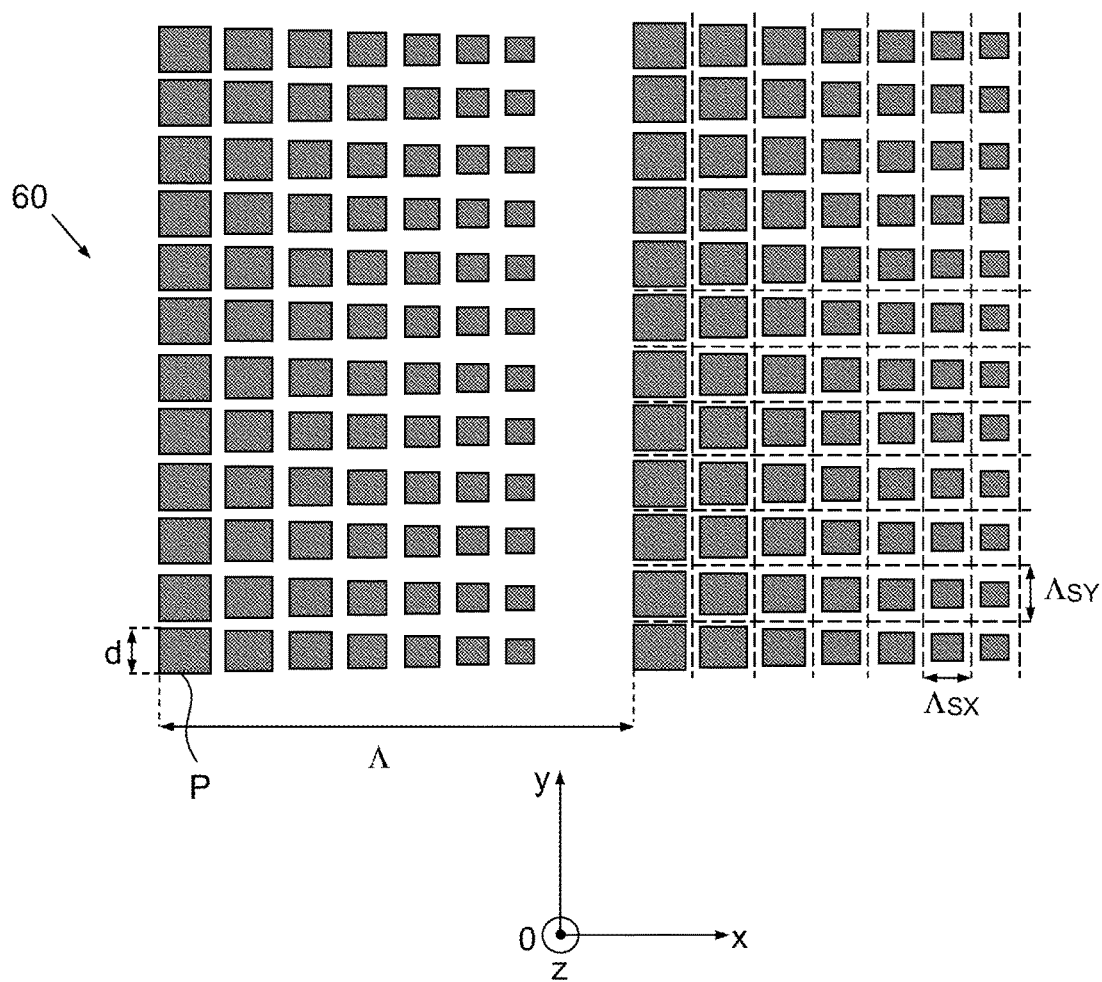
Figure 7:
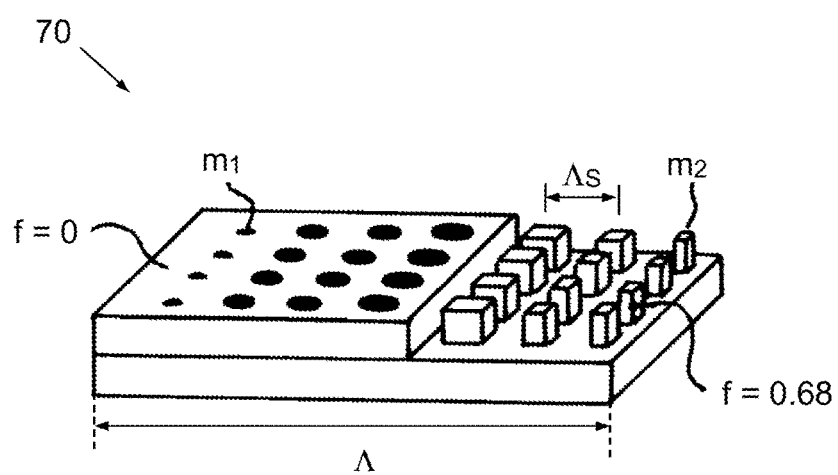

Thus, the existence of a plurality of blaze wavelengths enables the diffractive component (for example a grating or a Fresnel lens) according to the invention, that will be called binary multi-blaze diffractive component (binary meaning that it is based on microstructures), to exhibit a better wideband behaviour than a blazed component at a single wavelength as illustrated in FIG. 3 or 8. Furthermore, the weighting by the surface area gives a great design flexibility to obtain the desired efficiency. Illustrations of this property are given later.

Moreover, the design constraints weighing on each area of a given type are reduced.

Thus, the invention makes it possible to overcome the a condition for example or to allow a reduction of the a parameter while maintaining a good spectral efficiency. In effect, in the document WO 2005/038501, the wideband behaviour is obtained by virtue of a design making it possible to obtain a value of the a parameter that is fairly high (of the order of 0.3). For that, the authors have made a shrewd choice as to the sampling period, the material and the choice of the sizes and geometries of structures making it possible to obtain the desired a parameter. However, in some applications, it is not always possible to choose the materials. For example, the use of a material with low refractive index necessarily leads to a lower dispersion of its effective index. The consequence of this is a limitation on its wideband effect. The use of a binary multi-blaze component makes it possible to reduce the design constraints weighing on each area, thus allowing more degrees of freedom. It will for example be possible to combine several areas, certain areas being designed with a reduced a parameter and others with a higher a parameter, without reducing the spectral band of use.

The production technology for subwavelength diffractive components, typically lithography for optical applications and 3D printing for the structures operating in the millimetric domain, which make it possible to generate any geometry, is particularly suited to the fabrication of these components, impossible to produce with conventional echelette structures. It is fully compatible with the production of components combining different areas whether in the direction x and/or in the direction y.

For the case of a binary multi-blaze component corresponding to a Fresnel lens function as illustrated in FIGS. 12*a*-12*c,* the lens having a central part Pc and a plurality of peripheral parts a, each elementary area of type i corresponds to at least one sector of a part of the Fresnel lens.

According to a first embodiment, the sector of a given type corresponds to all of the part, that is to say that each part (Pa, a) constitutes an area of a certain type, for example all of the central area is of type 1 (blazed at $\lambda 1$), the first ring is of a second type (blazed at $\lambda 2$), the third ring is of a third type or of the first type or of the second type.

According to a second embodiment illustrated in FIG. 12*a,* the central part Pc and each peripheral ring have several sectors, the sectors being of different types.

For the case of binary multi-blaze grating corresponding to a grating function as illustrated in FIGS. 11*a*-11*c,* each elementary area of type i corresponds to a blazed grating at the blaze wavelength $\lambda i$ of index i, and therefore each elementary area exhibits a periodic effective index variation $n_{eff}(i)$ on an axis X of identical period $\Lambda$. To avoid the problems of discontinuity and not break the periodicity $\Lambda$, which allows the diffraction effect, the dimension of an elementary area in the direction X is equal to a multiple of the period $\Lambda$.

Preferentially, to maximize the diffraction efficiency, the elementary areas are contiguous.

Generally, the surface S on which the microstructures of the diffractive component 10 or 20 according to the invention are arranged is flat or curved, and the incident beam diffracted by the component is a light wave (typically visible and/or infrared) or radiofrequency wave. For the curved surfaces, technologies such as nanoimprint making it possible to define the patterns of structures on a spherical surface, for example from a flexible stamp, are particularly well suited. The stamp being fabricated for example by lithography and by etching.

The binary multi-blaze concept is applicable to components operating by reflection or by transmission.

For a binary multi-blaze component configured to diffract by transmission, the elementary areas are produced with a transparent material and arranged on a substrate that is also transparent, for example silica.

A binary multi-blaze component according to the invention configured to diffract an incident beam Fi according to a diffracted beam Fd by reflection also comprises a reflective surface or element R.

Figure 13:
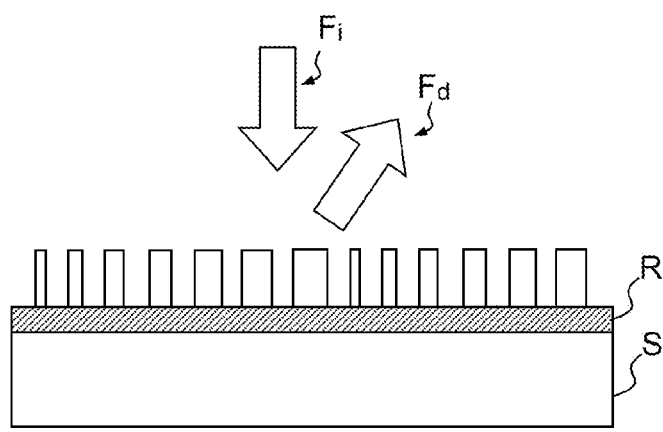
FIG. 13 illustrates a binary multi-blaze diffractive component according to the invention configured to diffract by reflection.

Preferentially, as illustrated in FIG. 13, the reflector R is arranged between the elementary areas Zi and a substrate S.

The elementary areas are, in this case, produced with a transparent material, but the substrate S may not be transparent.

The advantage of the use of a mirror underneath is to be able to use the dispersion of the effective index of the subwavelength structures, with a dielectric structure which synthesizes the phase function. In the case of the use of a structured metal or a metal above a subwavelength scale structured layer, extraordinary resonance or transmission phenomena can be encountered, which result in a strong drop in diffraction efficiency in reflection.

The reflector consists of a metallic layer or of an assembly of multiple dielectric layers.

Typically, for applications in space instrumentation, wideband reflective gratings are used, and for applications in imaging, for concentration functions, or for hyperbeam processing, Fresnel lenses operating in transmissive mode are used, to be easily incorporated in existing systems (hybrid systems combining conventional optics and diffractive optics). However, transmission gratings and reflection lenses may also be found.

The different variants and embodiments of the component according to the invention described here are applicable to the components operating by transmission or by reflection. In addition to the presence or otherwise of a reflector and the necessarily transparent or non-transparent nature of the substrate, the difference is the blaze condition to be borne out.

The effective index $n_{eff}(i)$ of a blazed diffractive element at a blaze wavelength $\lambda i$ varies between a minimum value $n_{eff/min}(i)$, and a maximum value $n_{eff/max}(i)$, with:

$$\Delta n_{eff}(i) = n_{eff/max}(i) - n_{eff/min}(i)$$

The microstructures MSi of an area of type i have a height hi of index i.

The blaze condition is expressed by a relationship linking the quantities $\Delta n_{eff}(i)$, hi and $\lambda i$. It corresponds to an effective index variation and a height calculated to induce a phase variation of $2\pi$ between incident beam and diffracted beam.

Advantageously, the phase law, and therefore the effective index variation, over a period (grating) or a part (central or peripheral of a lens) is quasi-monotonic.

According to one embodiment, the phase law, and therefore the effective index variation, over a period or a part is constant by sub intervals, that is to say variable in steps. The following considerations are given for a period of a grating but are also applicable for each part (central and rings) of a Fresnel lens. The period $\Lambda$ of the grating is sampled according to a sampling period $\Lambda sx$ less than $\Lambda$ dividing the period $\Lambda$ and defining the sampling intervals.

Generally, the sampling period is different for each type, but advantageously the sampling period according to X, $\Lambda sx$, is the same for all the types (direction of variation of the effective index). Advantageously, for a 2D microstructure geometry, the sampling period according to Y, $\Lambda sy$, is the same for all the types. According to a particular case, the sampling period according to X and Y is identical (square mesh).

The microstructures are arranged within each sampling interval so as to correspond to a given effective index value in the interval. The effective index variation $n_{eff}$ according to the period $\Lambda$ is thus sampled according to a period $\Lambda s$.

According to one embodiment, the phase law synthesized with the microstructures makes it possible to produce a stepwise or skipwise discontinuous phase law, each skip corresponding to a given phase value and therefore to a given effective index value.

It should be noted that the law of variation of the phase between 0 and $2\pi$ induced by the variation of the effective index is not necessarily linear (stepwise or not), it can be non-linear, even locally non-monotonic.

For a grating operating by transmission, the blaze condition is expressed:

$$\Delta n_{eff}(i).hi = \lambda i \qquad (6)$$

For a component operating by reflection (in the case where the reflective layer is located under the structured dielectric material):

$$2. \Delta n_{eff}(i).hi = \lambda i \qquad (7)$$

As explained above in the prior art, the microstructures (form, fill rate, height) are chosen such that the equations (6) or (7) are borne out.

A widening of the intrinsic spectral band of a blazed element at $\lambda i$ is moreover obtained for microstructures synthesizing an effective index variation exhibiting a coefficient $\alpha i$ that is strictly positive.

In other words, for any i of the component:

$$\alpha i = \frac{(\delta n_{i/min} - \delta n_{i/max})}{\Delta n_{eff}(i)} > 0$$

where $\Delta n_{eff} = n_{eff/max}(i) - n_{eff/min}(i)$, $\delta n_{i/min} = n_{eff/min}(i) - n_{eff/min}(\lambda_\infty)$ and $\delta n_{i/max} = n_{eff/min}(i) - n_{eff/max}(\lambda_\infty)$.

With i corresponding to a design wavelength $\lambda_i$ (or blaze wavelength) and $\lambda_\infty$ a great wavelength compared to the design wavelength $\lambda_0$.

These formulae are variable in transmission and in reflection subject to adapting the height h of the microstructures.

In order to simplify the fabrication of the binary multi-blaze component, the microstructures of the elementary areas are arranged such that the difference $\Delta n_{eff}(i)$ bears out the blaze condition for a height value h that is identical for all the types present in the component.

Figure 14:
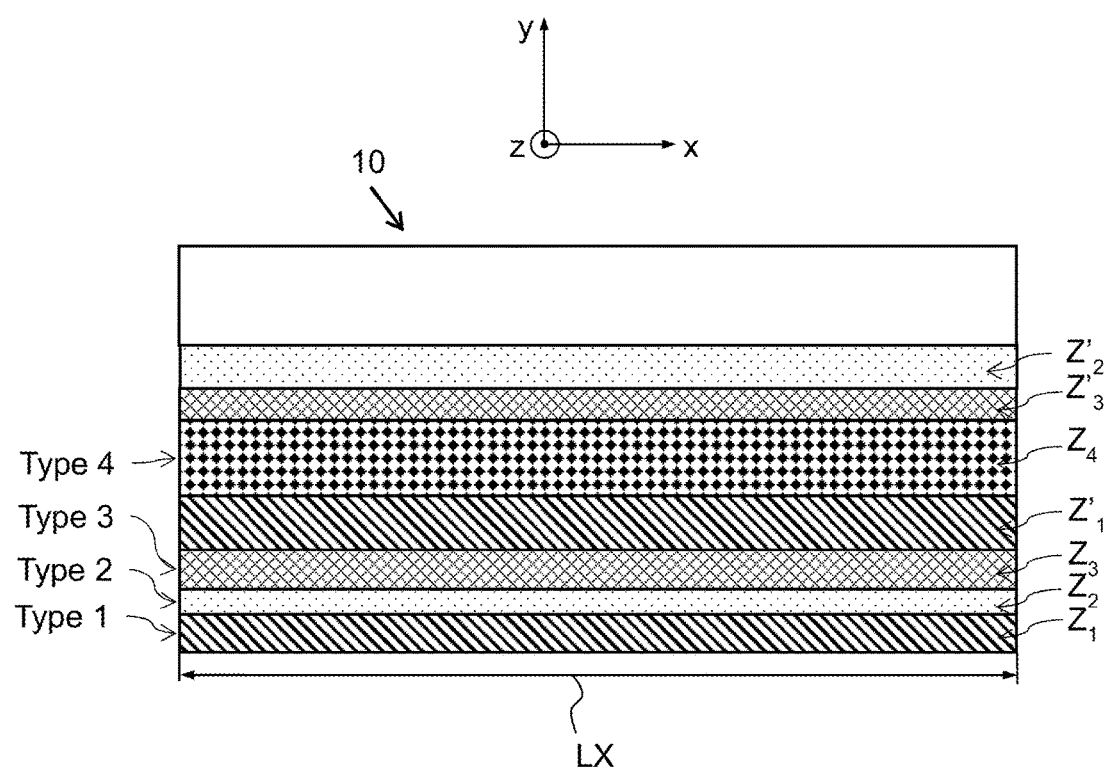
FIG. 14 illustrates a particular embodiment of a binary multi-blaze grating according to the invention.

Similarly, to simplify the design and the fabrication of the binary multi-blaze grating component, according to one embodiment, the dimension LX of an elementary area according to X corresponds to the dimension of the component according to X, as illustrated in FIG. 14. In this particular case, all the elementary areas Zi, Z'i . . ., have the same dimension according to X regardless of their type.

The microstructures can be arranged in different ways known from the prior art. The microstructures have a hexagonal, circular or square section. According to one embodiment, the microstructures have a plurality of sizes variable along a direction exhibiting an effective index variation. And, advantageously at most one microstructure is arranged per sampling interval. According to another embodiment, the microstructures have a given main size di0 (per type) and a density per unit of surface area that is variable along a direction exhibiting an effective index variation. Advantageously, di0 is identical regardless of i and equal to d0.

There now follows a description of examples of embodiments of reflection gratings arranged on a surface S that is flat XY, but the arrangements described are compatible with gratings operating by transmission or on a curved surface, for example, concave, convex, spherical or cylindrical.

According to one embodiment, the elementary areas are arranged according to a direction Y at right angles to X such that all the types follow one another once each a plurality of times. In other words, if the binary multi-blaze component comprises areas of three different types, the areas according to Y follow one another Z1, Z2, Z3, then once again three areas each of a different type Z'2, Z'1, Z'3, and so on. Generally, the dimensions according to Y of the different areas are different, but advantageously, the succession of the types and the dimension according to Y of the areas of each type are repeated identically. This makes it possible to simplify the elementary mask used to fabricate the binary multi-blaze grating.

Thus, there will be, according to Y, the succession Z1, Z2, Z3, then Z'1, Z'2, Z'3, then Z"1, Z"2, Z"3, the areas of one and the same type having a dimension according to Y that is identical for each alternation (that is to say a same multiple of the sampling period Λsy according to Y). The choice of weighting for each type is made over the elementary alternation Z1, Z2, Z3 which is then repeated according to Y.

FIGS. 15a-15b illustrate an example of a grating of this type. The grating is made up of two types of area 1 and 2 with λ1=850 nm and λ2=500 nm and they are represented as two periods Λ according to X and 5 alternations of the two areas according to Y. The sampling periods Λsx and Λsy are identical and each area has a dimension according to Y equal to a sampling period Λsy according to Y.

The areas comprise holes and/or pillars. The black colour corresponds to a dielectric material such as silica, and the white to air.

The blazed area 1 at 850 nm comprises 6 pillars and 40 holes, and the blazed area 2 at 500 nm comprises 46 holes.

The period Λ is 16 µm and the height h is 1.5 µm.

FIG. 16 illustrates the effective index variation over a period obtained for the two blaze lengths. The solid line curve corresponds to the type 2 blazed area at 500 nm and the dotted line curve corresponds to the type 1 blazed area at 850 nm. In this example, the index variation is linear and smoothed on the basis of the value obtained for each mesh.

FIG. 17 illustrates the diffraction efficiencies (as %) η(λ) calculated:
[1]: for a 500 nm blazed type 1 grating only,
[2]: for a 850 nm blazed type 2 grating only,
[1+2]: for a grating 10 according to the invention illustrated in FIGS. 15a-15b comprising several areas of type 1 and several areas of type 2 of equal overall surface area. Because of this, an identical weight is given to the two blaze wavelengths.

It is found that the overall diffraction efficiency over the diffraction spectral band [0.45 µm, 1.1 µm] is enhanced and is not equivalent to the average of the efficiencies of each blazed grating taken alone. At the diffraction level there is an interaction between diffracted complex amplitudes of the two grating types.

The high amplitude oscillations of the efficiency at the great wavelengths are due to a Fabry Perot effect specific to the reflective mode.

According to a preferred embodiment, the diffractive component according to the invention further comprises an anti-reflection layer AR, preferentially arranged above the microstructures, as illustrated in FIG. 19. The presence of this anti-reflection layer greatly attenuates the amplitude of the oscillations.

The anti-reflection layer can be arranged, for example, by PVD (Physical Vapour Deposition) like evaporation or sputtering or by CVD (Chemical Vapour Deposition) like ALD (Atomic Layer Deposition) or PECVD (Plasma Enhanced Chemical Vapour Deposition).

According to one embodiment, the air between the microstructures (pillars) or in the microstructures (holes) is replaced by a material. A degree of freedom is thus added to the design of the structure, and the presence of this material facilitates the deposition of the AR layer if necessary.

According to one embodiment, the anti-reflection layer AR is a subwavelength-scale structured layer, as illustrated in FIG. 19bis. FIG. 19bisa illustrates the structure of the component according to the invention by profiled view, FIG. 19bisb illustrates the anti-reflection layer AR seen from above and FIG. 19bisc illustrates an example of areas according to the invention seen from above.

The structuring of the anti-reflection layer consists, for example, in the production of holes therein, preferably through-holes as illustrated in FIG. 19bis, which lowers the effective index of the AR layer. The AR layer then constitutes a better anti-reflection for the microstructures produced with a low index material.

Figure 9:
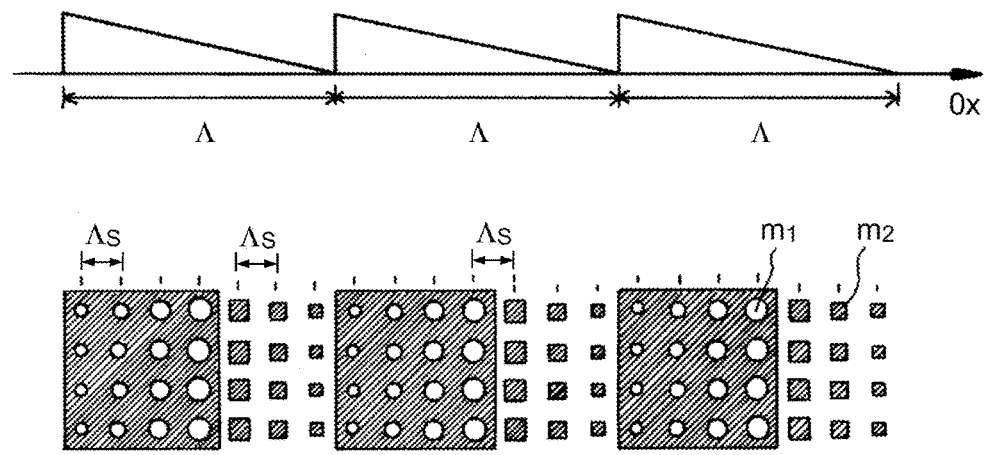
Figure 10:
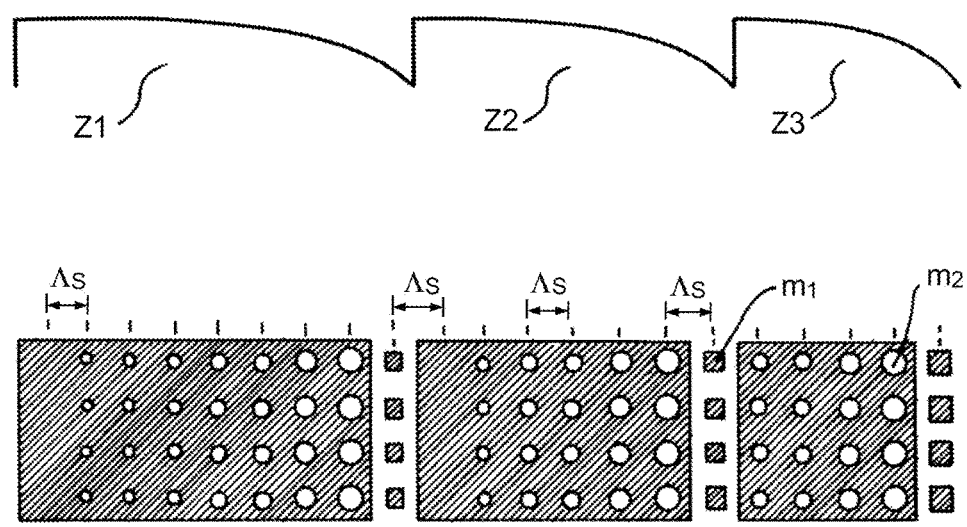

A variant of this preferred embodiment consists in adding a plurality of secondary microstructures MSsi to the basic microstructures MSi, the secondary microstructures having a size smaller than the size of the basic microstructures. These secondary microstructures are technologically feasible when the initial microstructures have sizes suited to the diffraction of the radiofrequency waves, that is to say typically sizes of mm or cm order (see document WO2014/128015 FIGS. 8 and 9 and corresponding description). They allow for a finer adjustment of the effective index value and produce an impedance matching (anti-reflection) layer.

FIGS. 20 and 21 illustrate two examples of grating 10 according to the invention operating in reflective mode as illustrated in FIG. 13, made up of two types of areas, the type 1 corresponding to a blaze at 850 nm and the type 2 to a blaze at 500 nm. The black colour corresponds to the material and the white colour to air. The period Λ is 2.45 µm and a period according to X is made up of 7 holes of height 1.7 µm whose respective size is determined so as to obtain the desired blaze. The material is silica of index n=1.455 at lambda=0.7 µm.

The grating of FIG. 20 is made up of an alternation of type 1 and 2 areas, each area corresponding to one times the sampling period according to Y. The proportion of surface area of each type is 50%, each type therefore has an identical weight.

The grating of FIG. 21 is made up of an alternation of a type 1 area having a dimension according to Y corresponding to one times the sampling period according to Y, and of a type 2 area having a dimension according to Y corresponding to two times the sampling period according to Y. The proportion of surface area of the component with a type 1 blazed grating is therefore 33% and the proportion of surface area for the type 2 is 67%, so a greater weight is therefore given to type 2 (blazed at 500 nm).

FIG. 22 illustrates the diffraction efficiency curves calculated for the two examples described previously, the curve C50/50 corresponding to the grating of FIG. 20 and the curve C67/33 corresponding to the grating of FIG. 21.

It can be seen that the two curves exhibit a very wide band diffraction efficiency between 0.35 and 1.1 µm. It can also be seen that the curve C67/33 which corresponds to a grating giving greater weight to the type 2 exhibits an efficiency that is globally higher at the visible wavelengths and lower at the IR wavelengths, compared to the grating giving an equivalent weight to both types.

Thus, the respective weights of the different types allows for a great flexibility in the design of the diffractive component, and makes it possible to choose the desired spectral performance levels of the component by relaxing the constraints weighing on the areas of a given type.

From the application point of view, this flexibility provides a significant advantage. In effect for example for applications in spectrometry, when designing a new instrument, it is advantageous, given the development of new detectors, to be able to adjust the diffraction efficiency of the grating relative to the spectral sensitivity of the detectors.

For the detectors less sensitive in the UV than in the infrared, it can be advantageous to compensate with a grating which is wideband with an enhanced efficiency on the low wavelengths and slightly reduced on the higher wavelengths.

It is also possible, in an optical system, to combine several types of detectors sensitive to spectral ranges of different wavelengths.

For the photovoltaic domain, the very wide band flux sensor systems necessitate having an optic capable of focussing the light on a multi-junction cell and the capacity to adjust a spectral band without losing efficiency. In effect, in the photovoltaic cells using multi-junction cells, the electrical setup of the cells being in series, the current is limited by the minimum current produced by different junctions, themselves having slightly different spectral sensitivities. In this case, it is advantageous to have an optic that makes it possible to adjust the diffraction efficiency and therefore the flux to make the current generated by each junction uniform.

The invention claimed is:

1. A wideband diffractive component capable of diffracting an incident beam exhibiting a wavelength lying in a diffraction spectral band,
the diffractive component comprising a plurality of elementary areas arranged on a surface, each elementary area belonging to a type indexed by an index i lying between 1 and n, with n strictly greater than 1, the index i corresponding to a blaze wavelength $\lambda i$ of index i, the blaze wavelengths lying in the diffraction spectral band,
an elementary area of type i (Zi, Z'i, Z''i) comprising a plurality of microstructures (MSi) respectively having at least a size (di) less than 1.5 times the blaze wavelength ($\lambda i$) of index i, the plurality of microstructures being arranged to form an artificial material exhibiting an effective index variation ($n_{eff}(i)$) such that an elementary area of type i constitutes a blazed diffractive element at the blaze wavelength $\lambda i$ of index i,
wherein different values of the blaze wavelengths and a proportion of surface area are occupied by a set of the elementary areas of a given type being a function of a global diffraction efficiency desired in the diffraction spectral band.

2. The diffractive component according to claim 1, wherein the elementary areas are contiguous.

3. The diffractive component according to claim 1, wherein said surface is flat or curved.

4. The diffractive component according to claim 1, wherein the incident beam is a light or radiofrequency wave.

5. The component according to claim 1, wherein which the elementary areas are arranged on a transparent substrate, said component being configured to diffract the beam by transmission.

6. The component according to claim 1, further comprising a reflector, the reflector being arranged between the elementary areas and a substrate, said component being configured to diffract the beam by reflection.

7. The component according to claim 1, corresponding to a Fresnel lens having a central part and a plurality of peripheral parts, in which each elementary area of type i corresponds to at least one sector of a part of the Fresnel lens.

8. The component according to claim 1, corresponding to a grating, each elementary area of type i corresponding to a blazed grating at the blaze wavelength $\lambda i$ of index i,
each elementary area exhibiting a periodic effective index variation on an axis X of period ($\Lambda$) that is identical for all the types, a dimension of an elementary area (LX) in the direction X being equal to a multiple of the period.

9. The component according to claim 8, wherein the dimension of an elementary area according to X (LX) corresponds to the dimension of the component according to X.

10. The component according to claim 9, wherein the elementary areas are arranged in a direction Y at right angles to X such that all the types each follow one another once, a plurality of times, and in which the order of the types and the dimension according to Y of the areas of each type is repeated identically.

11. The component according to claim 1, wherein the microstructures of an elementary area take the form of a pillar, a hole or a combination of the two.

12. The diffractive component according to claim 1, further comprising an anti-reflection layer arranged above the microstructures.

13. The diffractive component according to claim 12, wherein the anti-reflection layer is a subwavelength scale-structured layer.

14. The diffractive component according to claim 1, further comprising a plurality of secondary microstructures having a size smaller than the size of the basic microstructures.

15. The diffractive component according to claim 1, wherein:
an effective index variation of a blazed diffractive element at a blaze wavelength $\lambda i$ over a period of a grating or a part of a Fresnel lens exhibits a minimum value ($n_{eff\,min}(i)$) and a maximum value ($n_{eff\,max}(i)$), the difference between said effective index values being called $\Delta n_{eff}(i)$,
the microstructures (MSi) of an area of type i have a height hi of index i,
the quantities $\Delta n_{eff}(i)$, hi and $\lambda i$ being linked by a blaze condition defined by:
$\Delta n_{eff}(i).hi = \lambda i$ for a diffractive component operating by transmission,
2. $\Delta n_{eff}(i).hi = \lambda i$ for a diffractive component operating by reflection.

16. The diffractive component according to claim 15, wherein, for each elementary area of type i, the microstructures are arranged such that the difference $\Delta n_{eff}(i)$ bears out the blaze condition for a height value h that is identical for all the types.

17. The diffractive component according to claim 15, wherein, for each elementary area of type i, the microstructures are arranged such that the difference $\Delta n_{eff}(i)$ is chosen for a characterization parameter $\alpha i$ defined below to be strictly greater than 0 regardless of i:

$$\alpha i = \frac{(\delta n_{i/min} - \delta n_{i/max})}{\Delta n_{eff}(i)} > 0$$

with:
$n_{eff}(i)$ effective index variation of a blazed elementary area at the wavelength $\lambda i$ over a period (grating) or a part (Fresnel lens) between a minimum value $n_{eff/min}(i)$ and a maximum value $n_{eff/max}(i)$,
$\Delta n_{eff}(i) = n_{eff/max}(i) - n_{eff/min}(i)$,
$\delta n_{i/min} = n_{eff/min}(i) - n_{eff/min}(\lambda_\infty)$ and
$\delta n_{i/max} = n_{eff/max}(I) - n_{eff/max}(\lambda_\infty)$,
with i corresponding to a design wavelength $\lambda_i$ (or blaze wavelength) and $\lambda_\infty$ being a great wavelength compared to the design wavelength $\lambda_0$.

* * * * *